(12) United States Patent
Yu

(10) Patent No.: US 11,137,315 B2
(45) Date of Patent: Oct. 5, 2021

(54) LEAKAGE DETECTION CABLE AND METHOD FOR MANUFACTURING SAME

(71) Applicant: YUMIN SYSTEM TECHNOLOGY CO., LTD, Anyang-si (KR)

(72) Inventor: Hong Geun Yu, Seoul (KR)

(73) Assignee: YUMIN SYSTEM TECHNOLOGY CO., LTD, Anyang-si (KR)

(*) Notice: Subject to any disclaimer, the term of this patent is extended or adjusted under 35 U.S.C. 154(b) by 354 days.

(21) Appl. No.: 16/308,077

(22) PCT Filed: Jun. 2, 2017

(86) PCT No.: PCT/KR2017/005786
§ 371 (c)(1),
(2) Date: Dec. 7, 2018

(87) PCT Pub. No.: WO2017/213381
PCT Pub. Date: Dec. 14, 2017

(65) Prior Publication Data
US 2019/0265124 A1  Aug. 29, 2019

(30) Foreign Application Priority Data
Jun. 8, 2016  (KR) .................. 10-2016-0071337

(51) Int. Cl.
*G01M 3/16* (2006.01)
*H01B 7/02* (2006.01)
(Continued)

(52) U.S. Cl.
CPC .............. *G01M 3/165* (2013.01); *G01M 3/16* (2013.01); *H01B 3/48* (2013.01); *H01B 7/0216* (2013.01);
(Continued)

(58) Field of Classification Search
CPC .......... G01M 3/165; G01M 3/16; H01B 3/48; H01B 7/17; H01B 13/00; H01B 7/0216;
(Continued)

(56) References Cited

U.S. PATENT DOCUMENTS 4,557,974 A * 12/1985 Tsukuda ............... C10M 125/02
428/407
4,570,477 A * 2/1986 Sugibuchi ............. G01M 3/165
174/11 R
(Continued)

FOREIGN PATENT DOCUMENTS

| JP | 63-255652 | 10/1988 |
| JP | 05-120929 | 5/1993 |

(Continued)

OTHER PUBLICATIONS

WIPO, International Search Report of PCT/KR2017/005786 dated Sep. 8, 2017.

*Primary Examiner* — Herbert K Roberts
*Assistant Examiner* — John M Royston
(74) *Attorney, Agent, or Firm* — Lex IP Meister, PLLC

(57) ABSTRACT

The present invention provides a leakage detection cable and a method for manufacturing the same, and the leakage detection cable detects a leaking liquid and includes: an electric wire core which includes one or more conductive wires, and a sheath layer that covers the one or more conductive wires; a detection unit which is coupled in a longitudinal direction of a surface of the electric wire core; and a first braided layer which is braided with non-conductive fibers and covers the detection unit, in which the detection unit has a predetermined resistance value that is proportional to a length, and reacts with the liquid such that an output electric current value is changed.

28 Claims, 24 Drawing Sheets

(a)

(b)

(51) Int. Cl.
*H01B 7/32* (2006.01)
*H01B 13/00* (2006.01)
*H01B 13/06* (2006.01)
*H01B 3/48* (2006.01)
*H01B 7/17* (2006.01)

(52) U.S. Cl.
CPC ................. *H01B 7/17* (2013.01); *H01B 7/32* (2013.01); *H01B 13/00* (2013.01); *H01B 13/0036* (2013.01); *H01B 13/06* (2013.01)

(58) Field of Classification Search
CPC ...... H01B 7/32; H01B 13/0036; H01B 13/06; H01B 13/0026
See application file for complete search history.

(56) References Cited

U.S. PATENT DOCUMENTS

| | | | | |
|---|---|---|---|---|
| 4,926,165 A | * | 5/1990 | Lahlouh | G01M 3/045 340/603 |
| 5,079,065 A | * | 1/1992 | Masakazu | B32B 27/04 428/137 |
| 5,191,292 A | | 3/1993 | Klotz et al. | |
| 5,355,720 A | * | 10/1994 | Bailey | G01M 3/165 73/40 |
| 2012/0098555 A1 | * | 4/2012 | Raymond | G01M 3/045 324/694 |
| 2016/0064118 A1 | * | 3/2016 | Wakabayashi | H01B 7/0018 174/72 A |

FOREIGN PATENT DOCUMENTS

| | | |
|---|---|---|
| JP | 06-109577 | 4/1994 |
| JP | 07-029430 | 1/1995 |
| JP | 10-300627 | 11/1998 |
| JP | 11-304565 | 11/1999 |
| JP | 2010-108838 | 5/2010 |
| KR | 10-2011-0007501 | 1/2011 |
| KR | 10-1006710 | 1/2011 |
| KR | 10-2012-0131383 | 12/2012 |
| KR | 10-1372370 | 3/2014 |
| KR | 10-1467200 | 12/2014 |
| KR | 10-2015-0052609 | 5/2015 |
| KR | 10-2015-0127951 | 11/2015 |
| KR | 10-2015-0136297 | 12/2015 |

* cited by examiner

[FIG. 1]
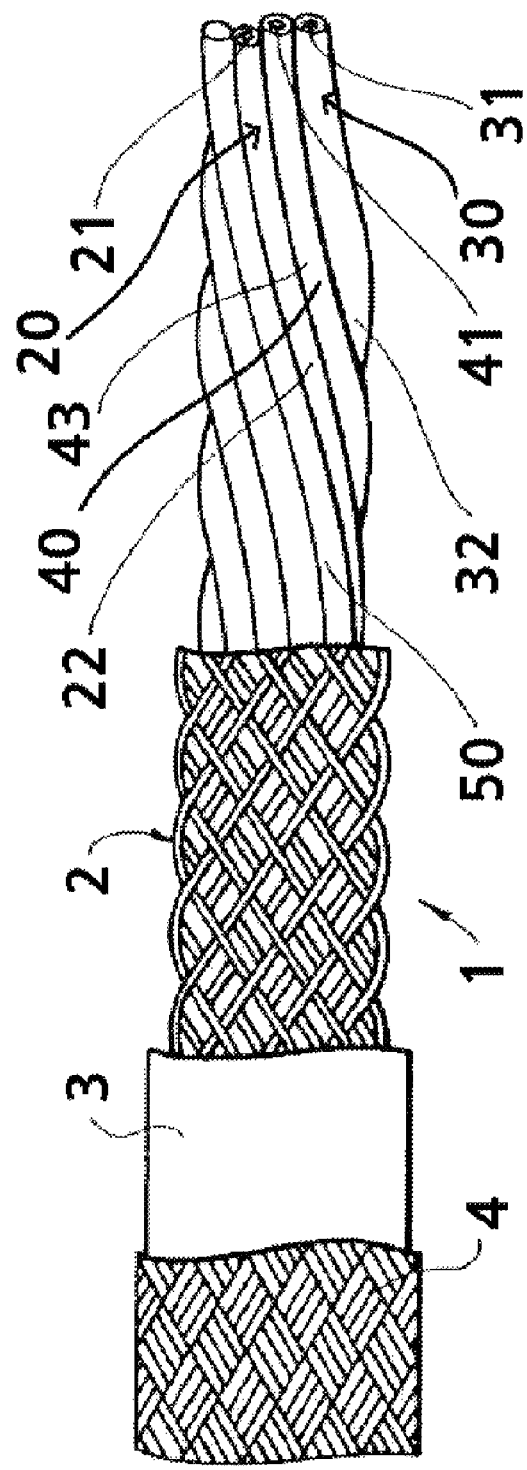

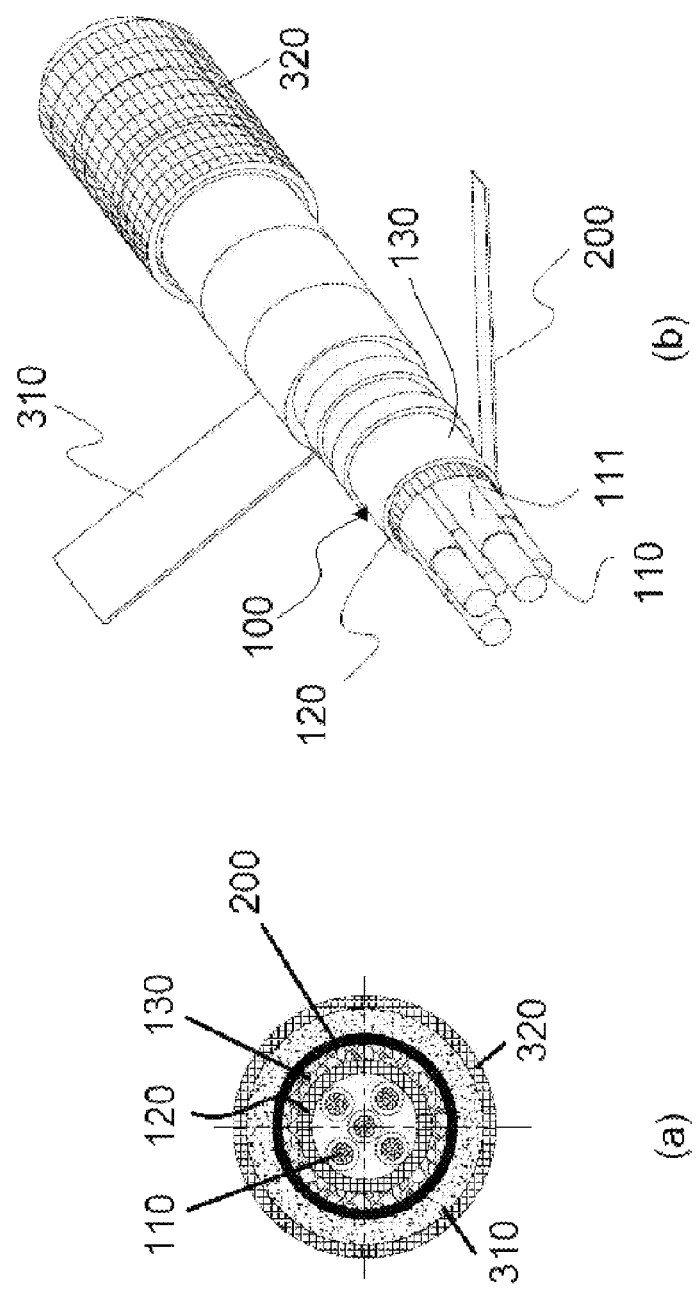
[FIG. 2]

[FIG. 3]
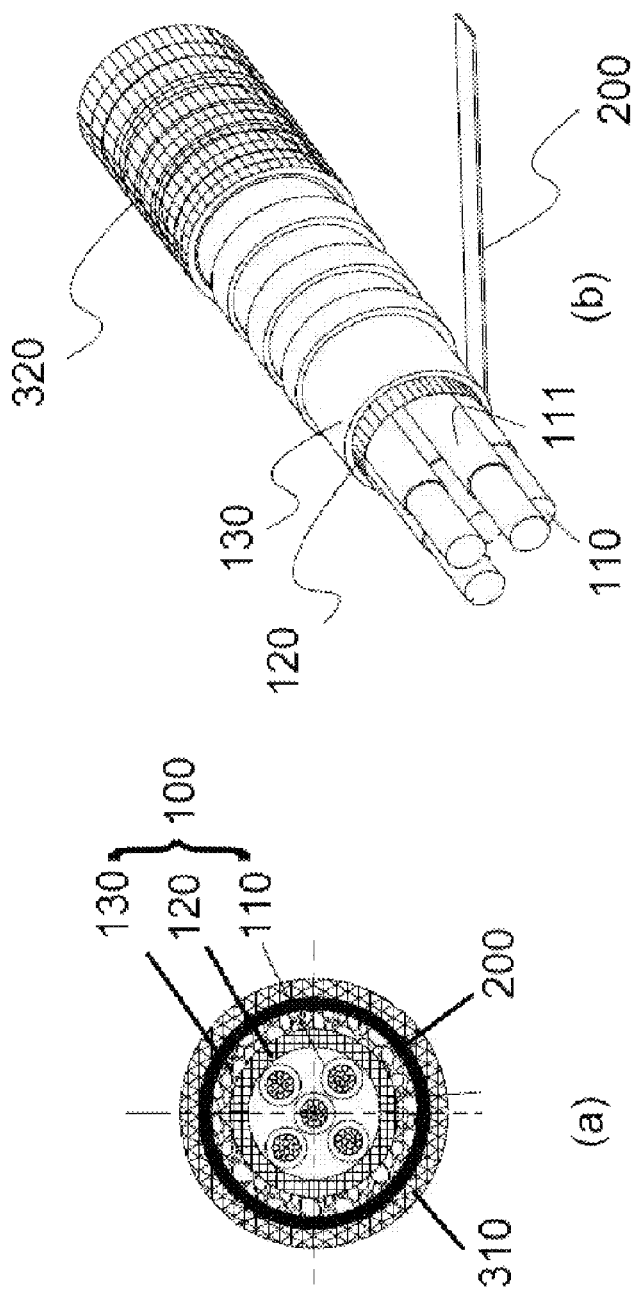

[FIG. 4]
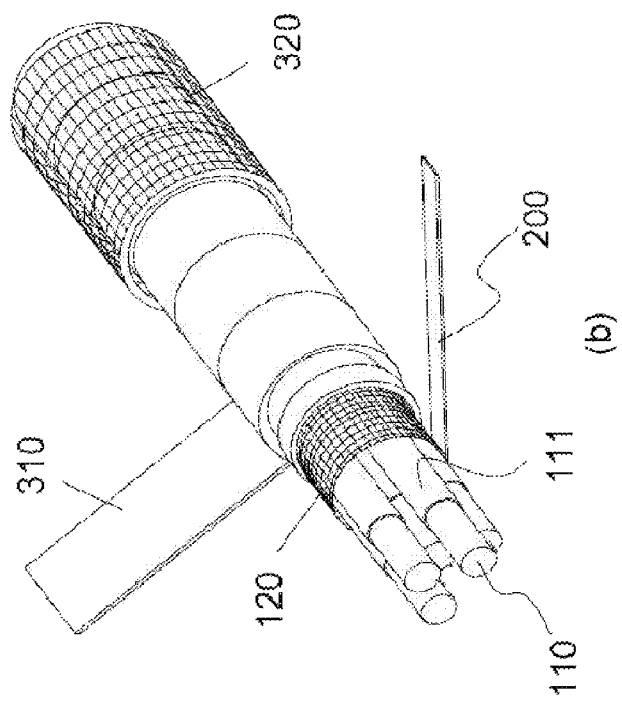
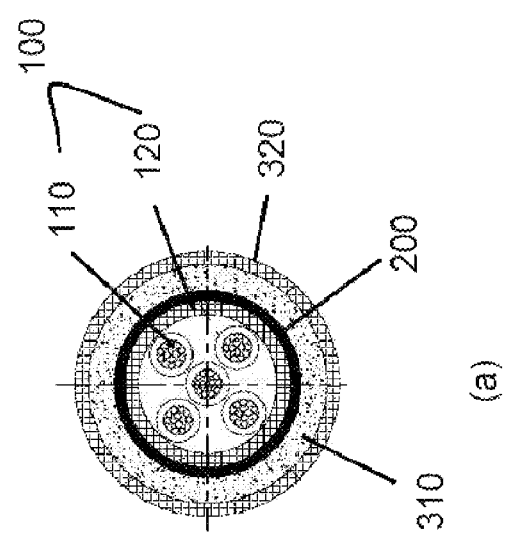

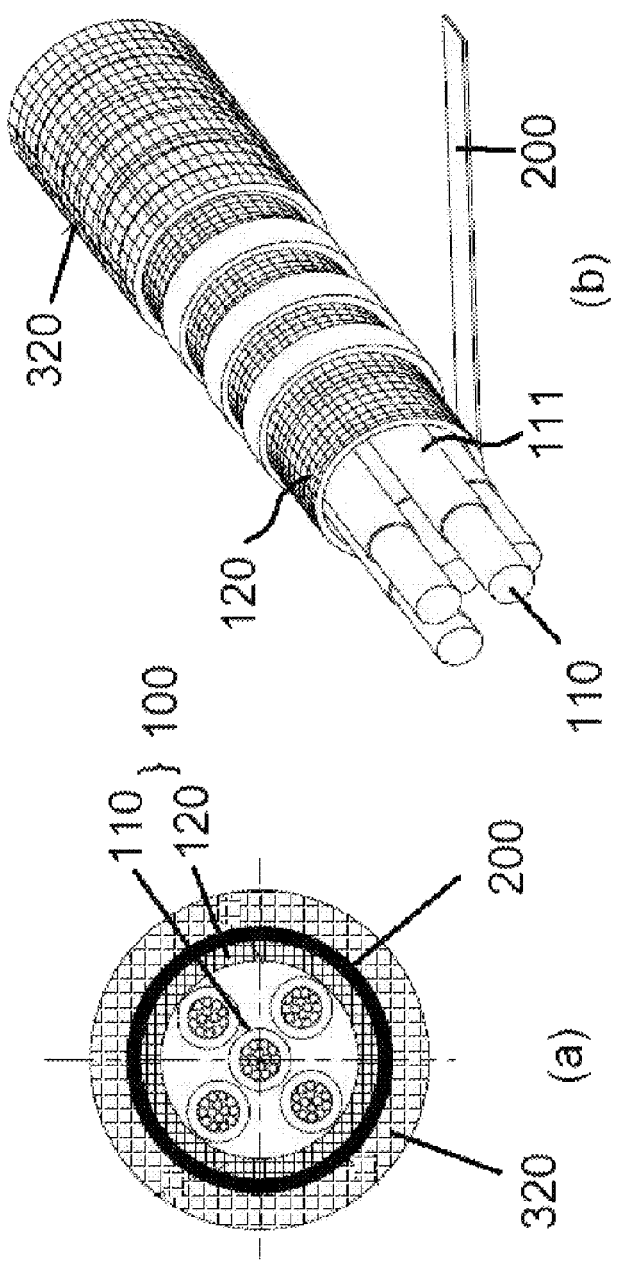
[FIG. 5]

[FIG. 6]
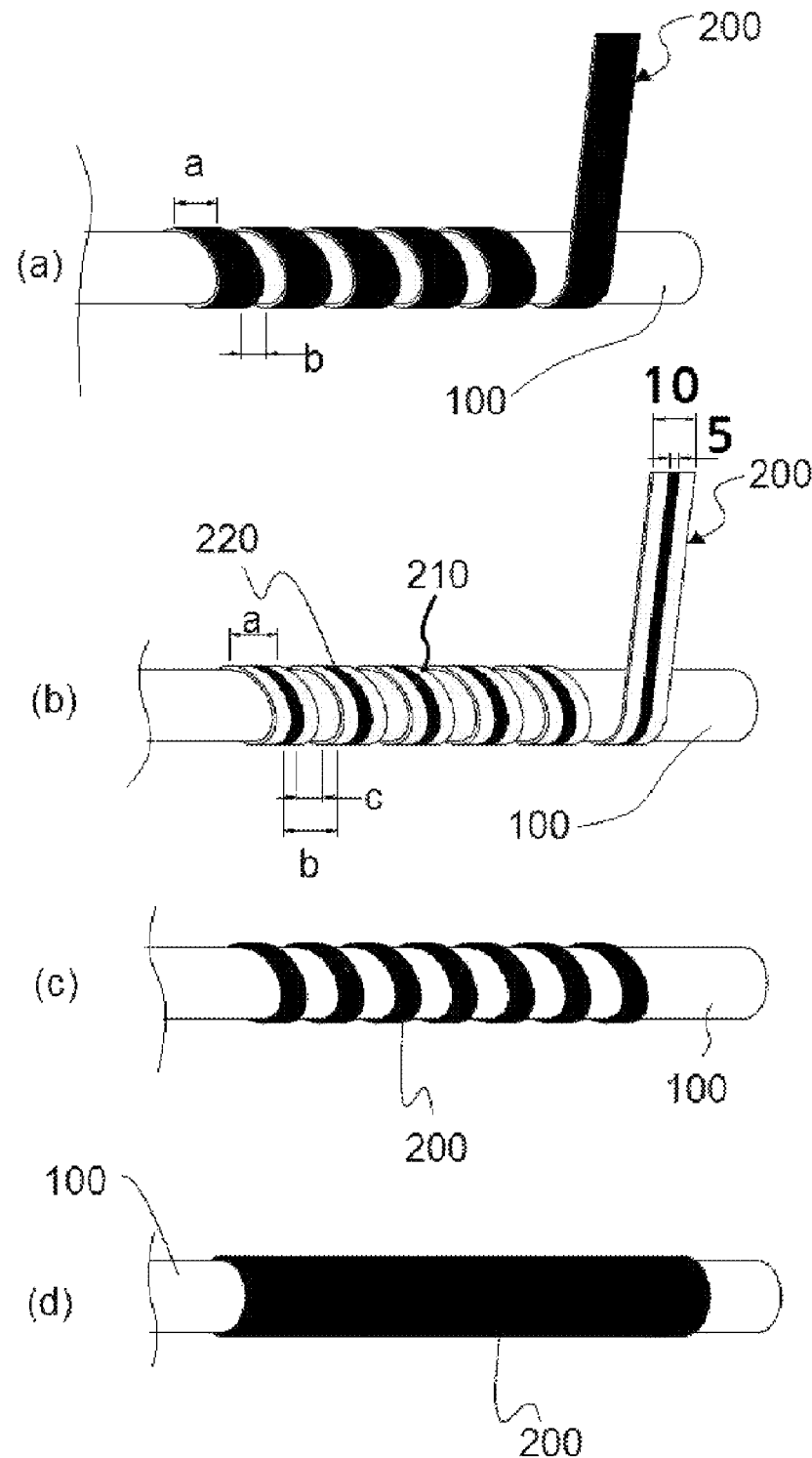

[FIG. 7]
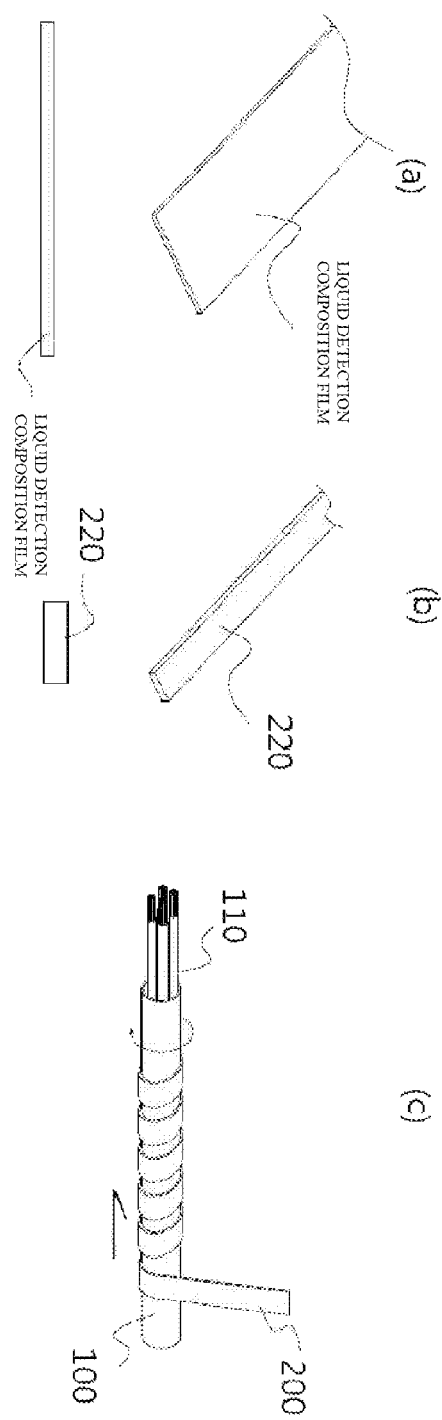

[FIG. 8]
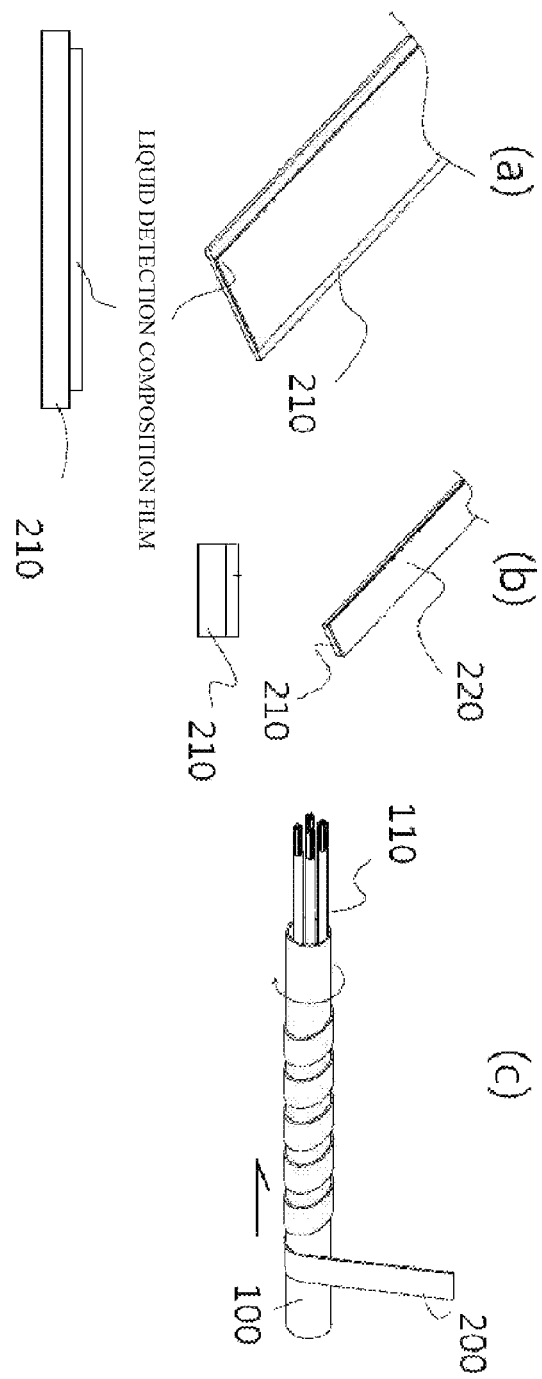

[FIG. 9]
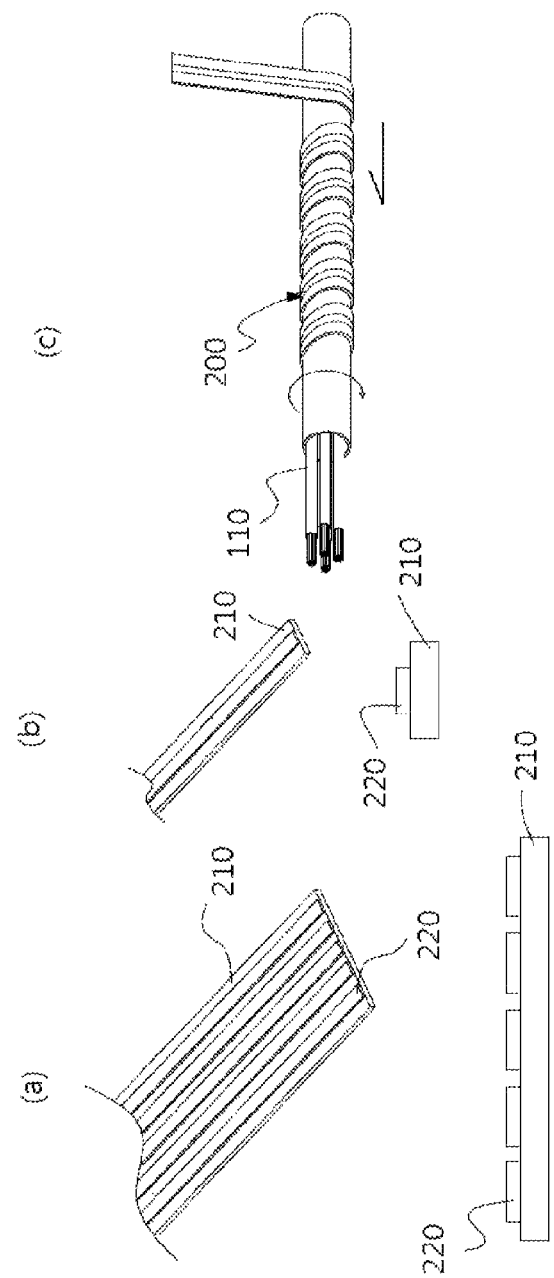

[FIG. 10]
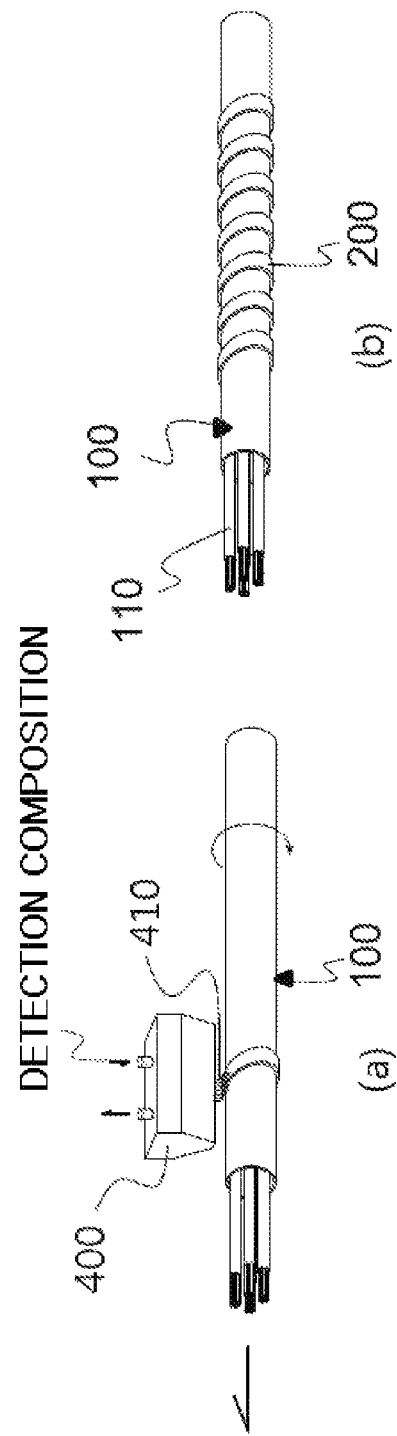

[FIG. 11]
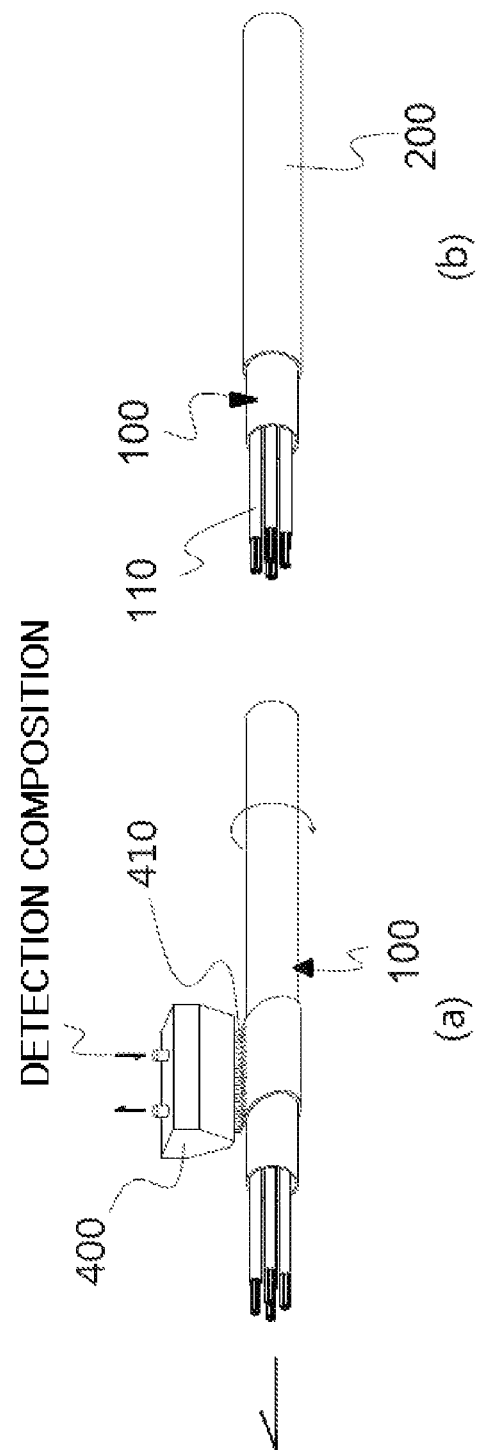

[FIG. 12]
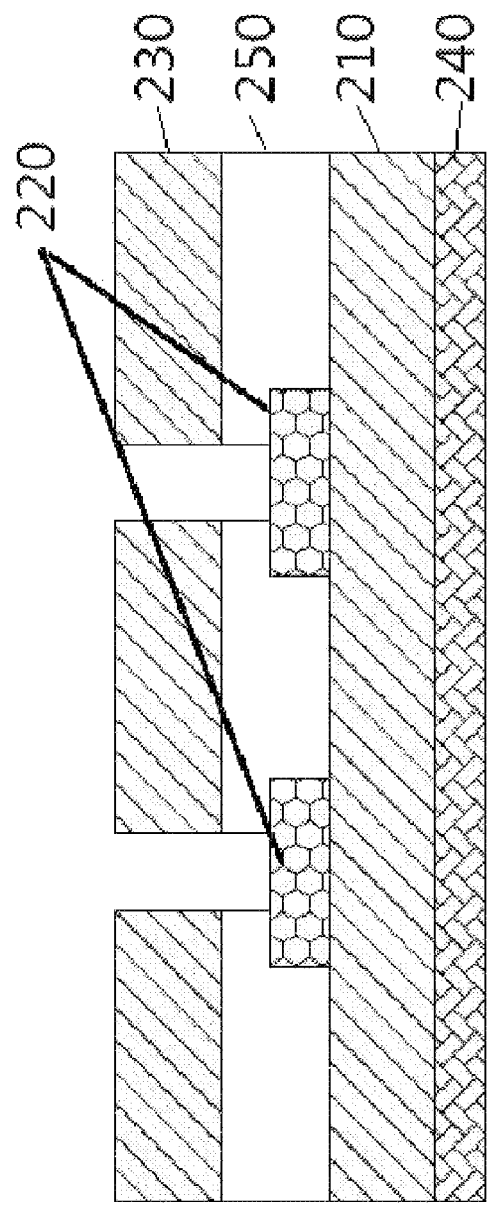

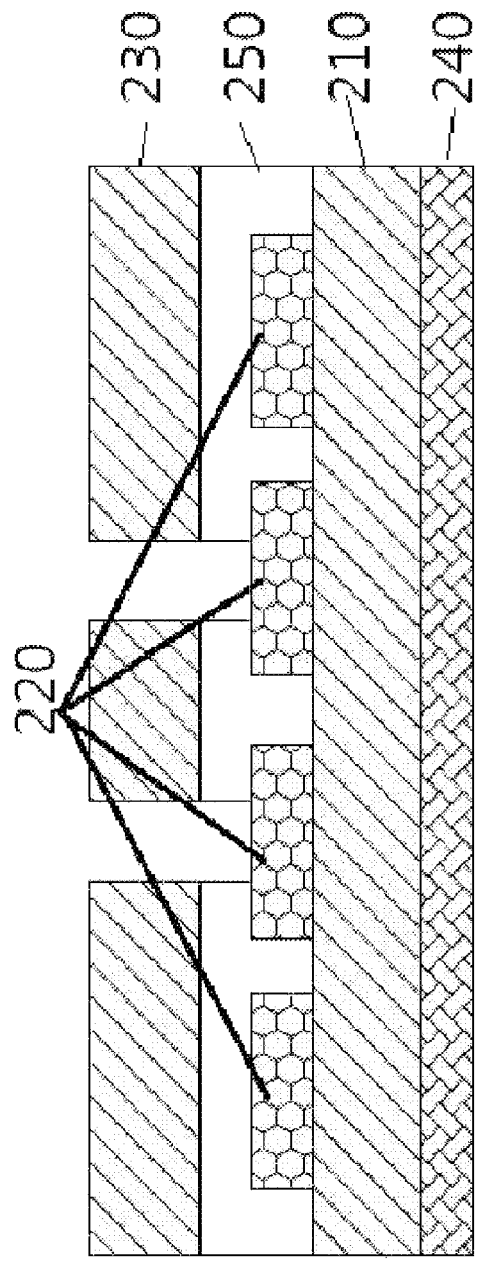
[FIG. 13]

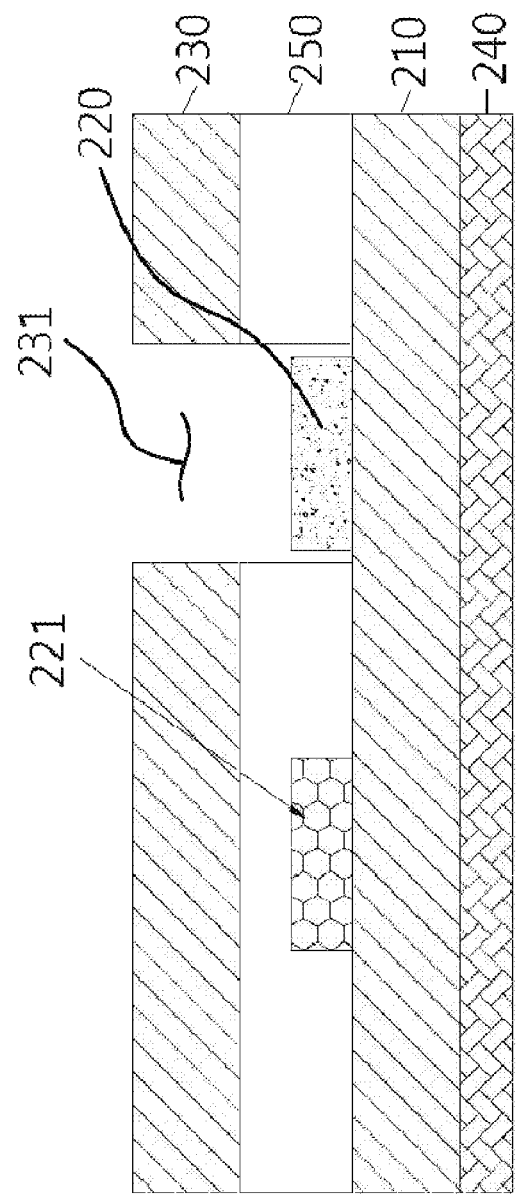
[FIG. 14]

[FIG. 15]
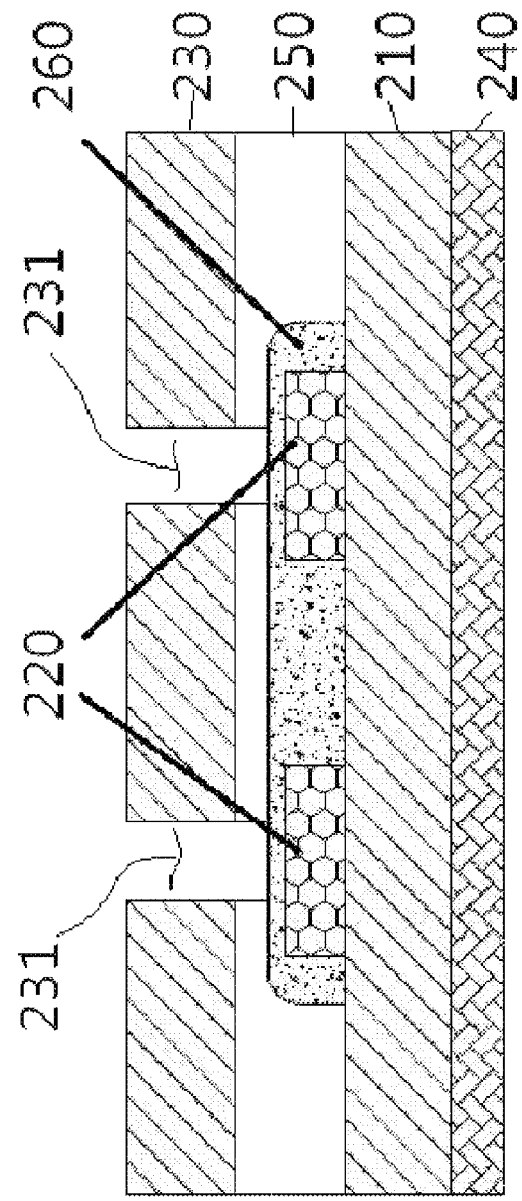

[FIG. 16]
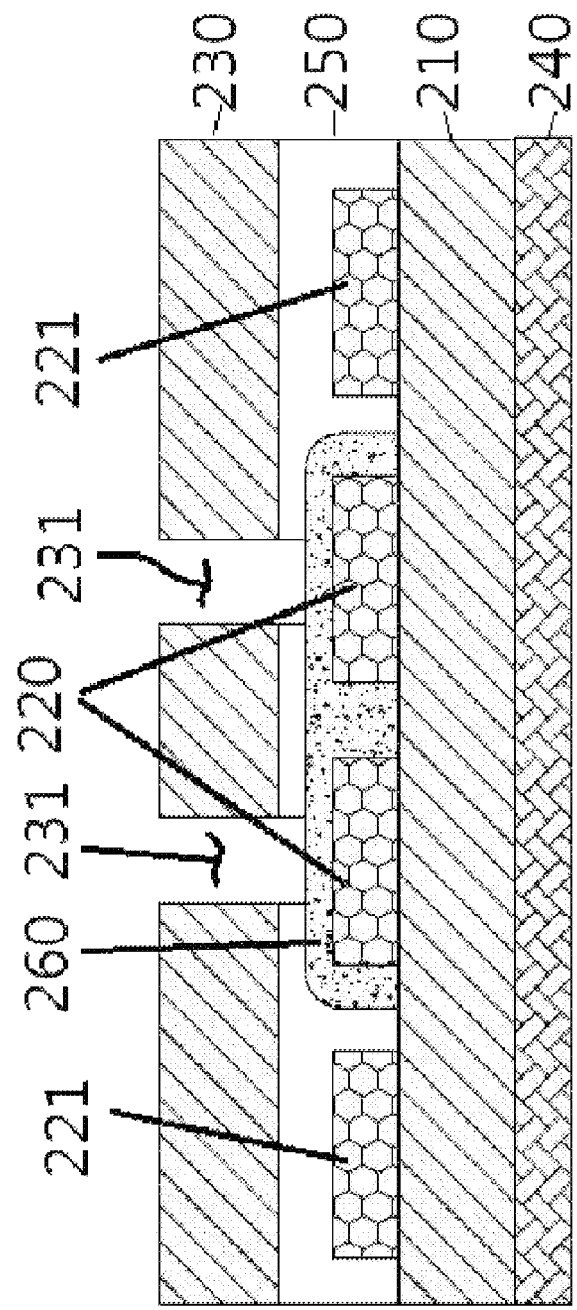

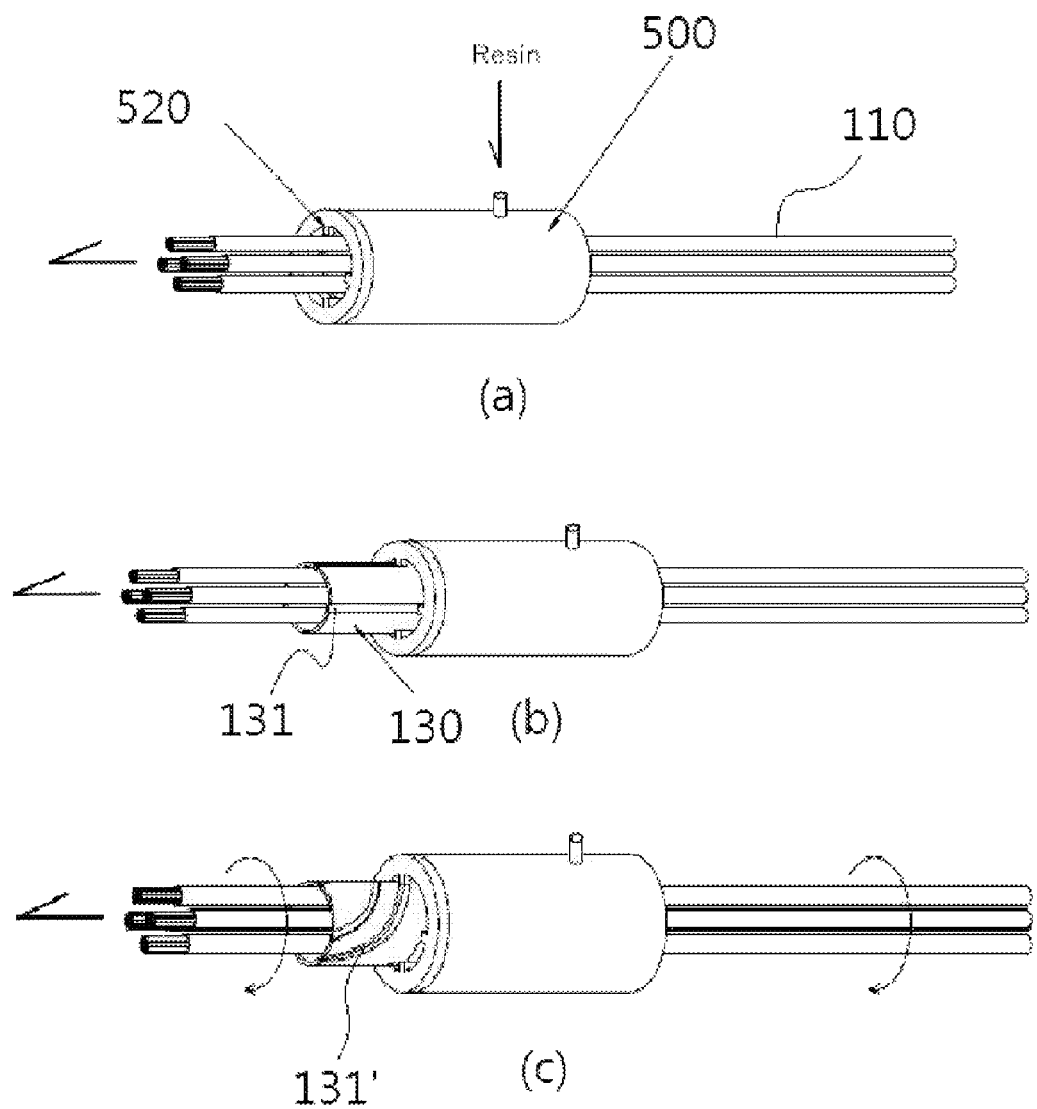
[FIG. 17]

[FIG. 18]
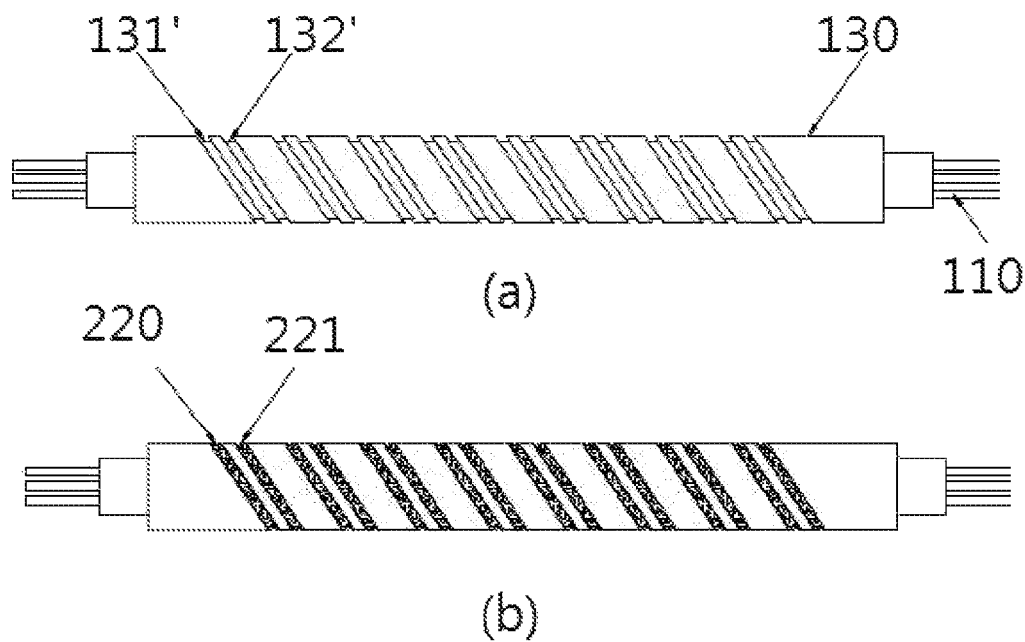

[FIG. 19]
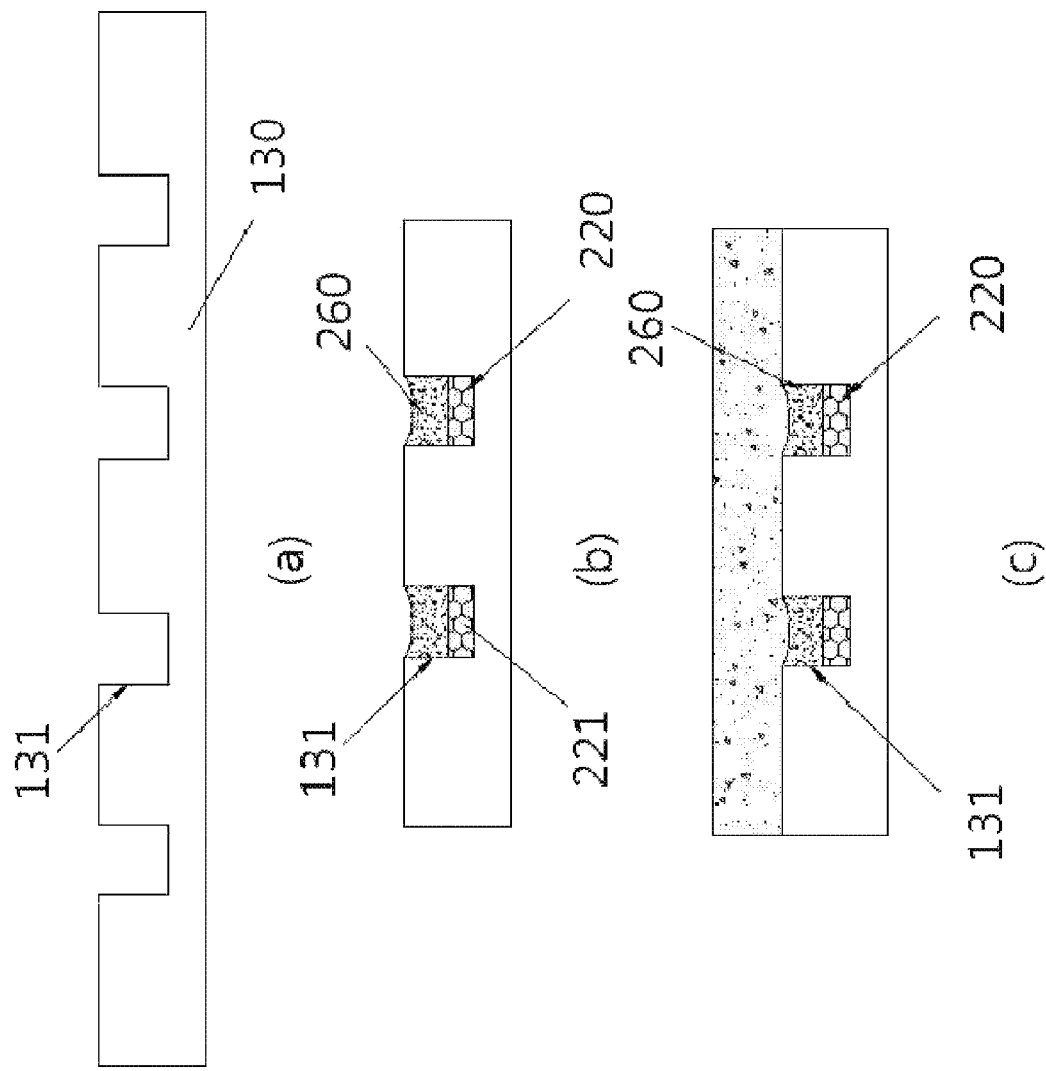

[FIG. 20]
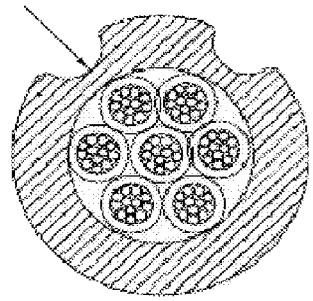
(a)
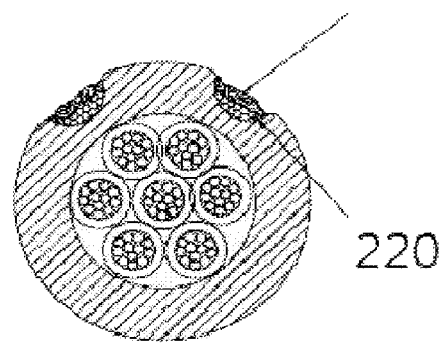
(b)
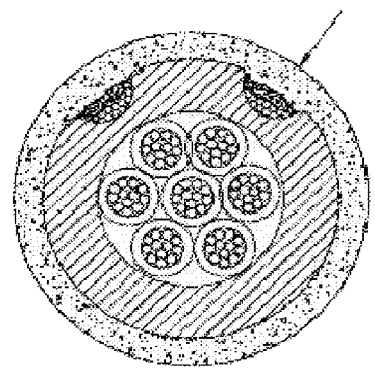
(c)

[FIG. 21]
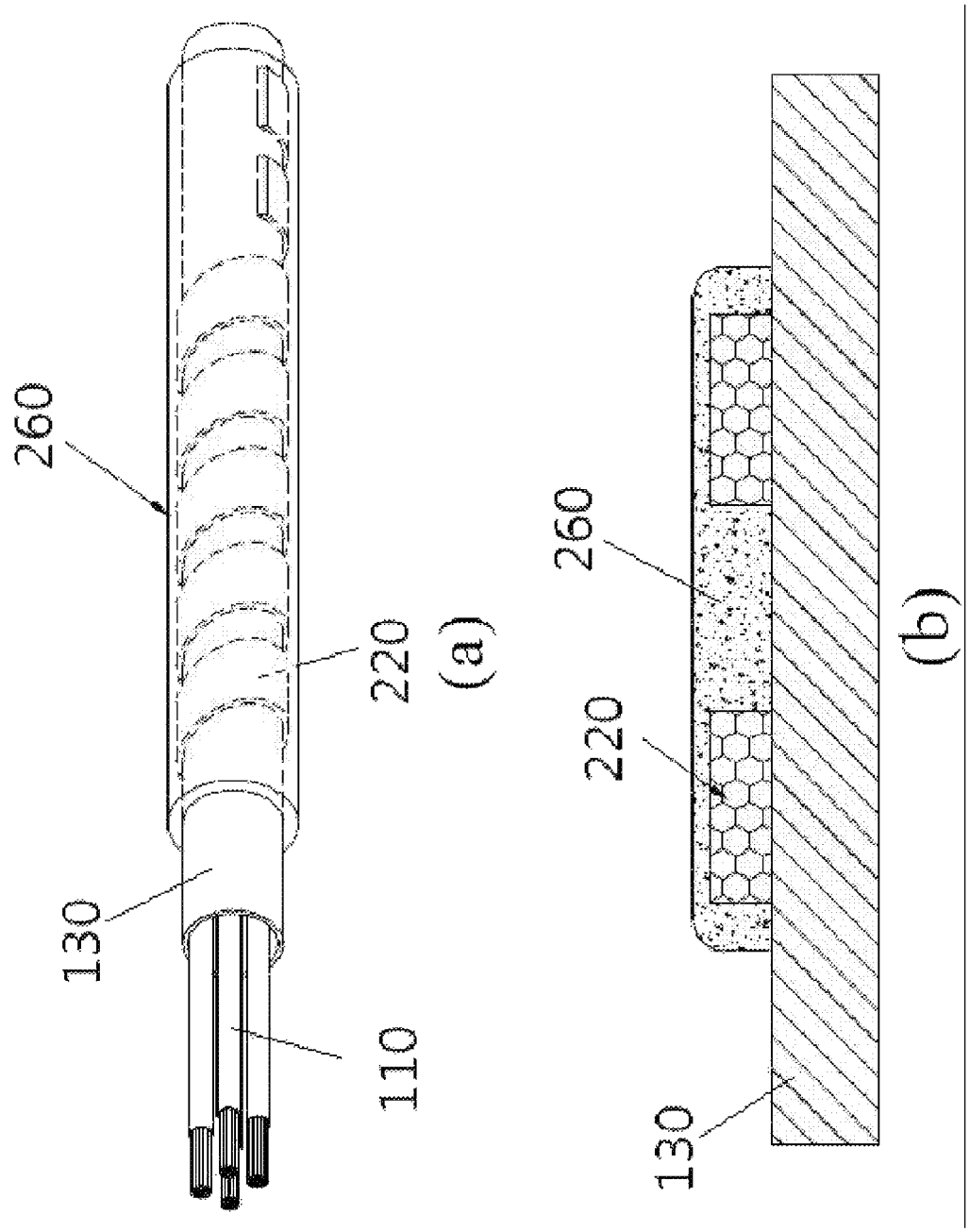

[FIG. 22]
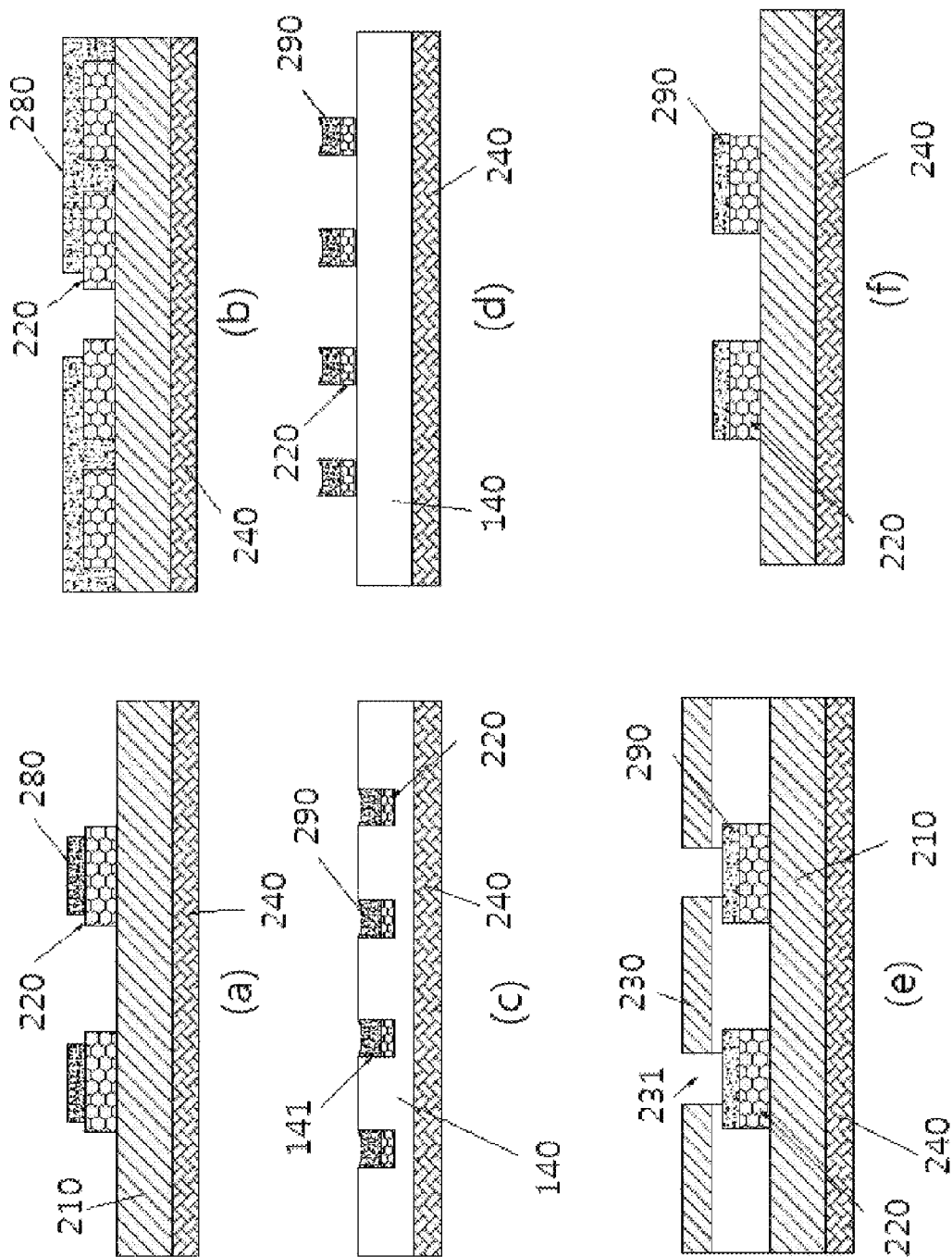

[FIG. 23]
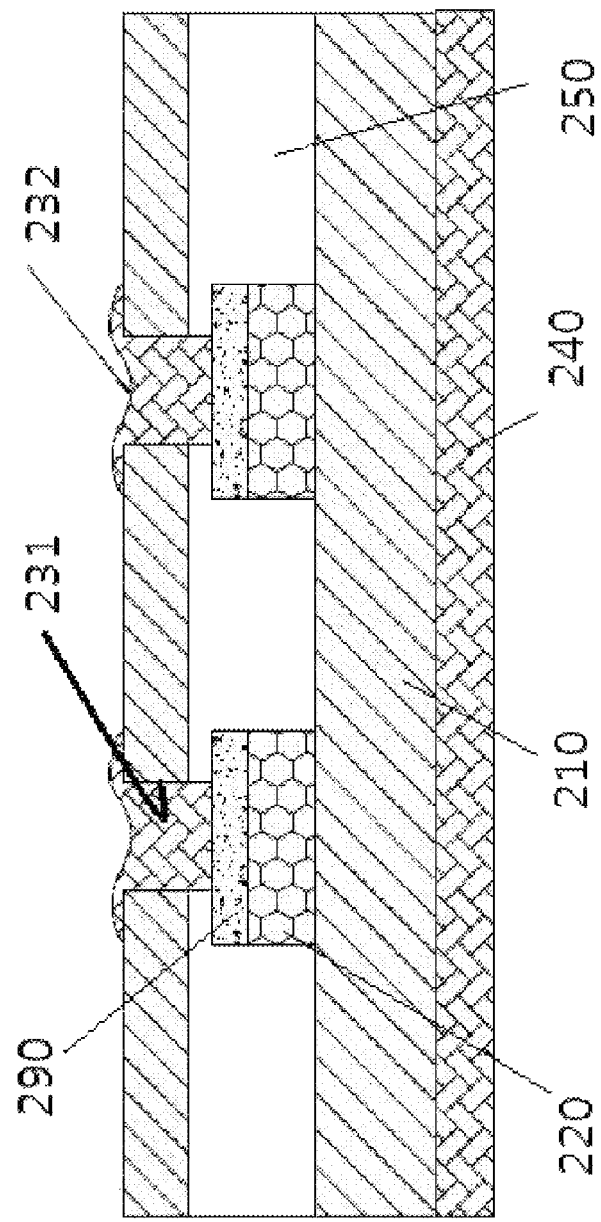

[FIG. 24]
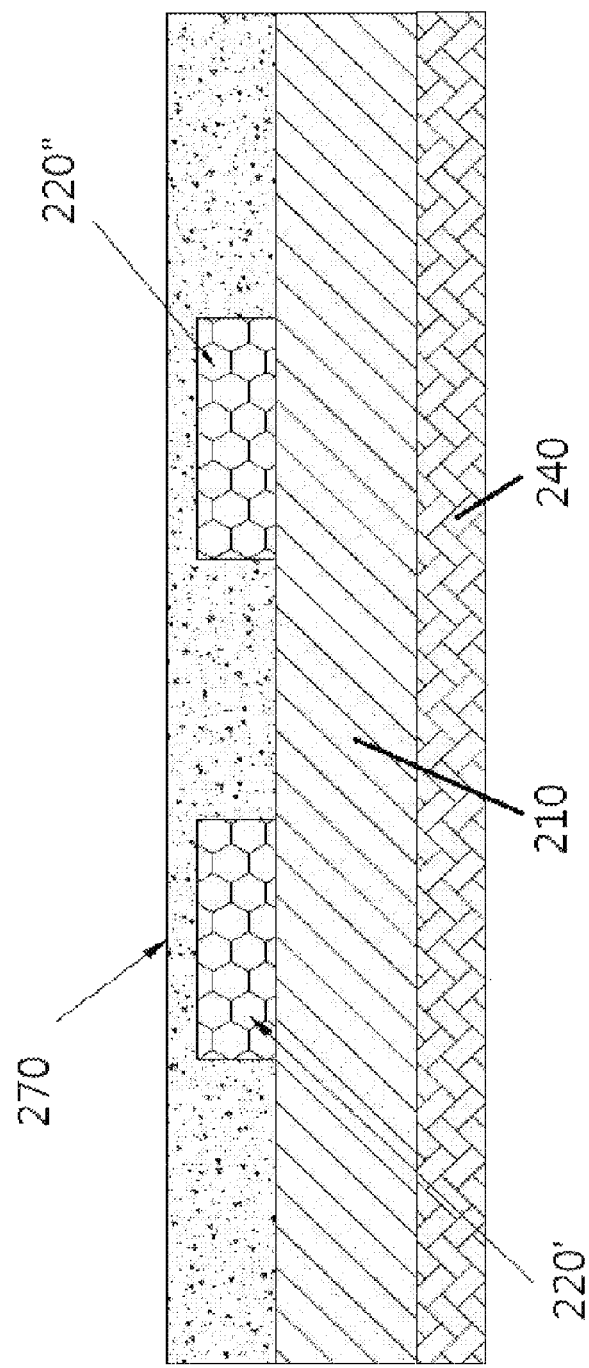

LEAKAGE DETECTION CABLE AND METHOD FOR MANUFACTURING SAME

TECHNICAL FIELD

The present invention relates to a leakage detection cable and a method for manufacturing the same.

BACKGROUND ART

Tanks and underground or outdoor pipelines are used to convey liquids such as crude oil, refined petrochemical products, or corrosive liquids such as acidic or basic liquids. Pipes, pipe connectors, and valves may leak when using the underground or outdoor pipelines. It is necessary to detect a leakage of the liquid from the pipeline.

Various devices for detecting the liquid leakage have been publicly known. A sensor cable may be used to detect a leakage of a liquid such as water, an organic solvent, or a corrosive liquid along a long path of the pipeline. The sensor cable may be disposed along an overall length of the pipeline or disposed at a portion where there is a great tendency for the occurrence of the leakage.

The sensor cable in the related art generally includes first and second conductors which are spaced apart from each other.

FIG. 1 is a view illustrating a structure of a sensor cable disclosed in U.S. Pat. No. 4,862,146. As illustrated, the sensor cable includes a core 1 that includes a first detection member 20 which includes a metal core 21 surrounded by a conductive polymer coating layer 22, a second detection member 30 which includes a metal core 31 surrounded by a conductive polymer coating layer 32, a first insulating member 40 which includes a metal core 41 surrounded by an insulating organic polymer jacket 43, and a second insulating member 50 which is made of an insulating organic polymer. A layer 3, which is made of a conductive polymer that expands when the conductive polymer comes into contact with hydrocarbon, is surrounded by a restriction member 4 made of glass fibers. The pair of detection members 20 and 30 has the same diameter, the pair of insulating members 40 and 50 has the same diameter, and the diameter of each of the insulating members 40 and 50 is greater by about 1.5 times than the diameter of each of the detection members 20 and 30. The insulating members 40 and 50 and the detection members 20 and 30 are assembled by being rotated and twisted at predetermined intervals. The conductive polymer layer 3 begins to expand when the conductive polymer layer 3 comes into contact with an organic liquid made of hydrocarbon, and the restriction member 4, which surrounds the conductive polymer layer 3, prevents the conductive polymer layer 3 from expanding toward the outside of the cable. Therefore, the conductive polymer layer 3 expands toward the inside of the cable when the conductive polymer layer 3 comes into contact with the organic liquid, thereby coupling and connecting the two detection members 20 and 30. With the effect of the conductive polymer layer 3 that expands due to a physical/chemical reaction with the organic liquid, the sensor cable detects contact with the organic liquid, and when the different detection members 20 and 30 are short-circuited and thus a voltage drop occurs, it is possible to ascertain that the organic liquid is detected.

When the sensing cable, which is configured as described above, comes into contact with the organic liquid, that is, only when the sensing cable is exposed, over a long period of time, at a large amount of organic liquid such as aviation fuel, gasoline, kerosene, light oil, benzene, and toluene having comparatively high volatility, the conductive polymer layer 3 begins to expand and allows the pair of detection members 20 and 30 therein to come into contact with each other, thereby detecting a leakage of the organic liquid. That is, there are problems in that liquid detection reaction time of the sensing cable is shortened as the organic liquid has high volatility and the amount of liquid is large, and the reaction time irregularly varies in accordance with a temperature in a peripheral environment in which the sensing cable is installed. Therefore, there is a problem in that it is very difficult to detect an organic liquid such as lubricating oil, high-pressure working fluid, insulating oil, photoresist, bunker-C oil, and animal/vegetable oil having very low volatility and to detect a small amount of organic liquid. In addition, there are problems in that abnormal leakage detection alarm often occurs at a high temperature of 60° C. or higher, and the reaction is performed, at a low temperature below zero, slower by several times or several tens of times than liquid detection sensing reaction time at room temperature.

In addition, there is a problem in that when physical pressing force or bending force, which is equal to or higher than a rating load, is applied to the outside of the sensing cable, the restriction member 4 including a braided layer made of a glass fiber material cannot withstand the pressing force or the bending force. Even though the diameter of each of the insulating members 40 and 50 is different by 1.5 times from the diameter of each of the detection members 20 and 30, there is a problem in that when the conductive polymer layer 3 is pressed due to external physical pressing force or bending force which is equal to or higher than a rating load, the conductive polymer layer 3 is short-circuited, and as a result, abnormal leakage detection alarm occurs.

Meanwhile, a film-type leakage detecting sensor in the related art has a configuration in which a conductive line is formed on a base film layer and a protective layer covers the conductive line. In a case in which the film-type leakage detecting sensor configured as described above is installed outdoors, there are problems in that the protective layer is easily damaged in the outdoor environment and the conductive line for detecting a leakage is damaged.

DISCLOSURE

Technical Problem

The disclosed technology has been contrived to solve the aforementioned problems, and an object of the present invention is to provide a leakage detection cable which is manufactured such that a band-shaped detection line, which is made of a composition that detects a leaking liquid, surrounds, in the form of a screw, an electric wire core and a non-woven fabric for absorbing the leaking liquid and a braided layer cover the detection line, such that the leakage detection cable has both an advantage of a film sensor and an advantage of a cable sensor, and thus has an excellent leakage detection performance, and is not easily damaged in an external environment.

Another object of the present invention is to provide a leakage detection cable capable of detecting, within several minutes, a small amount of organic liquid having high volatility and a small amount of organic liquid having low volatility such as lubricating oil, insulating oil, working fluid, animal oil, and vegetable oil.

Still another object of the present invention is to provide a leakage detection cable which does not cause abnormal liquid detection alarm at a high temperature of 60° C. or higher and may smoothly operate without a great variation in sensing reaction time even at a low temperature below zero.

Yet another object of the present invention is to provide a leakage detection cable which allows only a liquid, which is intended to be detected, to be absorbed by a detection line to prevent malfunction, and may be safely installed outdoors, under the ground, and in the water by blocking soil, ultraviolet ray, and physical external pressure such as external frictional force, such that the leakage detection cable may be used in a high-temperature environment.

Technical Solution

To achieve the aforementioned objects, one aspect of the present invention provides a leakage detection cable which detects a leakage of a liquid, the leakage detection cable including:

an electric wire core which includes one or more conductive wires, and a sheath layer that covers the one or more conductive wires;

a detection unit which is coupled in a longitudinal direction of a surface of the electric wire core; and a first braided layer which is braided with non-conductive fibers and covers the detection unit, in which the detection unit has a predetermined resistance value that is proportional to a length, and reacts with the liquid such that an output electric current value is changed.

According to one aspect of the present invention, the leakage detection cable may further include a second braided layer which is braided with a fiber made of a conductive material and surrounds the one or more conductive wires to shield the one or more conductive wires.

According to one aspect of the present invention, the sheath layer may be braided with non-conductive fibers.

According to one aspect of the present invention, the leakage detection cable may further include a non-woven fabric which is made of a material having absorptiveness in respect to the detection target liquid and surrounds the detection unit.

According to one aspect of the present invention, the detection unit may include a detection line manufactured by cutting a film made of a composition, which detects the detection target liquid, in a band shape having a predetermined width.

According to one aspect of the present invention, the detection unit may include a film base layer, and one or more detection lines formed by vapor-depositing, coating, or printing a composition, which detects the detection target liquid, or by plating or vacuum-vapor-depositing a conductive material on an upper surface of the film base layer.

According to one aspect of the present invention, the detection unit may include a film base layer, and a detection line formed by vacuum-vapor-depositing or printing a composition, which detects the detection target liquid, on an upper surface of the film base layer, and then cutting the composition together with the film base layer in a band shape having a predetermined width.

According to one aspect of the present invention, the detection unit may be coupled to surround, in the form of a screw in a state of being spaced at a predetermined interval, an outer surface of the electric wire core.

According to one aspect of the present invention, a bonding layer to be attached to the outer surface of the electric wire core may be additionally coupled to a bottom surface of the film base layer.

According to one aspect of the present invention, the detection unit may include a detection line formed by printing, plating, or vacuum-vapor-depositing a composition, which detects the detection target liquid, on a surface of the electric wire core in a band shape having a predetermined width.

The detection line may be coupled to surround, in the form of a screw in a state of being spaced at a predetermined interval, a surface of the electric wire core.

The detection unit may be formed by printing, plating, or vacuum-vapor-depositing a composition, which detects the leaking liquid, on the entire surface of the electric wire core.

When the detection target liquid is a liquid hydrocarbon compound, the composition may include carbon, an oil coagulant, a binder, and a diluent.

When the detection target liquid is a conductive liquid, the composition may be selected from a group consisting of conductive ink, silver ink, conductive polymer, and conductive metal.

The detection unit may include a detection line which reacts with the detection target liquid, and a conductive line which is electrically connected to the detection line and transmits a signal.

The detection unit may include a detection line which reacts with the detection target liquid, and one or more of the conductive wires of the electric wire core may be connected to the detection line and may transmit a signal.

A protective layer may be additionally coupled to the detection unit so as to cover the detection line.

The protective layer may be formed to have a narrower width than the detection line.

Sensing holes, through which the detection target liquid passes, may be formed at predetermined intervals at positions of the protective layer corresponding to the detection lines.

The leakage detection cable may further include a detection coating film which covers the detection line before the protective layer is coupled, and is decomposed by the detection target liquid, allows the detection target liquid to penetrate therethrough, or absorbs the detection target liquid.

The detection coating film may be formed by a coating liquid including one or more polymers selected from a group consisting of polyurethane, polyethylene, enamel, varnish, alkyd resin, and vinyl-based resin.

The detection coating film may be formed by a coating liquid including carbon. A thickness of the detection coating film may be any one selected from 0.05 μm to 100 μm.

An upper surface of the detection line is coated with a mixture of carbon and fluoride resin.

A groove portion may be formed in the sheath layer of the electric wire core, and a detection line may be formed by inputting a composition, which detects the leaking liquid, into the groove portion and curing the composition.

The groove portion may have a predetermined width and a predetermined depth in a longitudinal direction of a surface of the electric wire core and may be formed in a screw shape in a state of being spaced at a predetermined interval.

The detection unit may include a pair of detection lines, and one line of the pair of detection lines may be made of an element that has a higher degree of electrolysis than the other line, and the detection lines may be coated with an absorbent, which absorbs the leaking liquid, so that the absorbent covers the detection lines.

The detection unit may include a multilayer conductive circuit line formed by laminating metal, which has relatively low electrical conductivity and has corrosion resistance, on a metal layer having relatively good electrical conductivity.

Another aspect of the present invention provides a method for manufacturing a leakage detection cable which detects a leakage of a liquid, the method including:

a) disposing one or more conductive wires;

b) forming a sheath layer to cover the one or more conductive wires in a longitudinal direction;

c) disposing a detection unit in a longitudinal direction of the sheath layer; and d) forming a first braided layer by braiding non-conductive fibers to cover the detection unit.

The step (c) may include: attaching a masking tape onto the sheath layer so that a band-shaped interval having a predetermined width and a predetermined thickness is formed in a screw shape; forming a conductive thin film by performing a method selected from coating, printing, vacuum vapor deposition, and plating on the sheath layer to which the masking tape is attached by the attaching of the masking tape; and removing the masking tape.

The step c) may include forming a conductive thin film on an entire surface of the sheath layer, and forming a band-shaped conductive detection line having a predetermined width and a predetermined thickness in a longitudinal direction of a surface of the sheath layer by using a photolithography process and an etching process so that the conductive detection line surrounds, in the form of a screw, the surface of the sheath layer.

Advantageous Effects

As described above, the leakage detection cable according to the present invention has both of the advantage of the film sensor and the advantage of the cable sensor, and thus an excellent leakage detection performance, and is not easily damaged in an external environment.

In addition, the leakage detection cable according to the exemplary embodiment of the present invention may be applied to devices for detecting leakages of various liquids such as moisture, liquid chemicals, and organic liquids.

In addition, the leakage detection cable according to the exemplary embodiment of the present invention may minimize abnormal liquid detection alarm caused by external physical impact, pressing force, frictional force, bending force, or the like.

In addition, the leakage detection cable according to the exemplary embodiment of the present invention has a structure that prevents a liquid other than a liquid, which is intended to be detected, from penetrating through and coming into contact with the detection line, and has strong physical mechanical strength, thereby providing applicability because the leakage detection cable may be installed and used outdoors, under the ground, in the water, and on the water surface as well as indoors over a long period of time.

In addition, the leakage detection cable according to the exemplary embodiment of the present invention may quickly detect, within several seconds to several minutes, even a small amount of organic liquid having low volatility as well as organic liquids having high volatility, does not cause abnormal liquid detection alarm at a high temperature of 60° C. or higher, and may smoothly operate without a rapid variation in reaction time even at a low temperature below zero.

In addition, the leakage detection cable according to the exemplary embodiment of the present invention is made by a process similar to a process of manufacturing a general electrical cable or communication cable, and as a result, manufacturing costs are also small.

DESCRIPTION OF DRAWINGS

FIG. 1 is an exploded side view of a leakage detection cable in the related art.

FIG. 2 is a view illustrating a cross section and a disassembled state of a leakage detection cable according to an exemplary embodiment of the present invention.

FIG. 3 is a view illustrating a cross section and a disassembled state of a leakage detection cable according to another exemplary embodiment of the present invention.

FIG. 4 is a view illustrating a cross section and a disassembled state of a leakage detection cable according to still another exemplary embodiment of the present invention.

FIG. 5 is a view illustrating a cross section and a disassembled state of a leakage detection cable according to yet another exemplary embodiment of the present invention.

FIG. 6 is a side view schematically illustrating configurations of detection units according to the exemplary embodiments the present invention.

FIG. 7 is a view illustrating the exemplary embodiment illustrated in FIG. 6A.

FIG. 8 is a view illustrating another exemplary embodiment illustrated in FIG. 6A.

FIG. 9 is a view illustrating the exemplary embodiment illustrated in FIG. 6B.

FIG. 10 is a view illustrating the exemplary embodiment illustrated in FIG. 6C.

FIG. 11 is a view illustrating the exemplary embodiment illustrated in FIG. 6D.

FIGS. 12 to 16 are cross-sectional views illustrating configurations of the detection units according to the exemplary embodiments of the present invention.

FIGS. 17 and 18 are views illustrating a process of manufacturing the leakage detection cable according to the exemplary embodiment of the present invention.

FIG. 19 is a view schematically illustrating one cross section of the exemplary embodiment of the leakage detection cable manufactured as illustrated in FIGS. 17 and 18.

FIG. 20 is a cross-sectional view illustrating the exemplary embodiment of the leakage detection cable manufactured as illustrated in FIGS. 17 and 18.

FIG. 21 is a transparent view and a partially cross-sectional view schematically illustrating a liquid chemical detection cable according to another exemplary embodiment of the present invention.

FIGS. 22 to 24 are cross-sectional views illustrating configurations of the detection units of the leakage detection cables according to the exemplary embodiments of the present invention.

BEST MODE

Since the present invention may be variously modified and include various forms, exemplary embodiments will be described in detail. However, the description is not intended to limit the present invention to the specific exemplary embodiments, and it is to be understood that all the changes, equivalents, and substitutions belonging to the spirit and technical scope of the present invention are included in the present invention. In the description of the drawings, similar reference numerals will be used for similar constituent elements. The terms such as "first" and "second" may be used to describe various constituent elements, but the constituent elements should not be limited by the terms. The terms are used only for the purpose of distinguishing one constituent element from the other constituent elements. Terms used in the present application are used only to describe specific exemplary embodiments, and are not intended to limit the present invention. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those with ordinary skill in the technical field to which the present invention pertains unless otherwise defined. Terms defined in a generally used dictionary shall be construed that they have meanings matching those in the context of a related art, and shall not be construed in ideal or excessively formal meanings unless they are clearly defined in the present specification.

Hereinafter, exemplary embodiments of the present invention will be described with reference to the accompanying drawings. Like reference numerals designate like constituent elements regardless of the drawings. Repeated descriptions in the exemplary embodiments will be omitted.

A leakage detection cable 1000 according to exemplary embodiments of the present invention is a cable-type liquid detection device which is installed in a region where a leaking liquid needs to be detected, and outputs a leakage detection signal to a leakage detection system, such that it is possible to detect whether a liquid leaks in the region where the leakage detection cable is installed.

FIG. 2 illustrates a leakage detection cable according to a first exemplary embodiment of the present invention. FIG. 2A is a cross-sectional view, and FIG. 2B is an exploded perspective view. As illustrated, the leakage detection cable includes an electric wire core 100 which includes one or more conductive wires 110, a second braided layer 120 that surrounds the conductive wires 110, and a sheath layer 130 that surrounds the second braided layer 120, a detection unit 200 which is coupled along an outer surface of the electric wire core 100, and a non-woven fabric 310 which surrounds the detection unit 200, and a first braided layer 320 which surrounds the non-woven fabric.

The electric wire core 100 includes the one or more conductive wires 110, the second braided layer 120 which surrounds the conductive wires 110, and the sheath layer 130 which covers the second braided layer 120. The one or more conductive wires 110 are lines used for a power source and/or communication required for the leakage detection system. The conductive wire 110 may be coated with a sheath 111 made of non-conductive fluoride resin or polymeric resin. The second braided layer 120, which surrounds the one or more conductive wires 110, may be braided with conductive or non-conductive yarn. The second braided layer 120 serves to tightly fix a coupling structure of the multiple conductive wires 110. In a case in which the second braided layer 120 is manufactured by braiding conductive yarn such as a SUS material, the second braided layer 120 may serve to shield the conductive wires 110. The conductive wires 110 may be surrounded by a metal thin film instead of the second braided layer 120 such that the conductive wires 110 may be shielded. The sheath layer 130 may be made of non-conductive fluoride resin such as Teflon or polymeric resin, thereby surrounding and protecting the second braided layer 120.

The detection unit 200 includes one or more detection lines 220 which are formed by plating, printing, vapor-depositing, vacuum-vapor-depositing, etching, or patterning an electrically conductive material or formed as a metal thin plate, a wire, or the like. The detection unit may include the multilayer detection line 220 formed by laminating metal, which has relatively low electrical conductivity and has corrosion resistance, on a metal layer having relatively good electrical conductivity. The multilayer detection line 220 may be formed by laminating metal such as gold, silver, copper, or aluminum having high conductivity and then covering the metal with metal such as chromium, nickel, titanium, or molybdenum having corrosion resistance by vacuum vapor deposition. The detection line 220 may be made of a leakage detection composition that reacts with a detection target liquid. That is, the detection line 220 has a predetermined resistance value which is proportional to a length thereof, and the detection line 220 reacts with a detection target liquid in a liquid such as water, an acidic or alkaline solution, or oil so that an output electric current value is changed, and as a result, whether a leakage is detected may be determined. In a case in which the detection target liquid is a liquid hydrocarbon compound such as petroleum, crude oil, gasoline, lubricating oil, vegetable oil, or animal oil, the leakage detection composition may include carbon nanotubes (CNT), an oil coagulant, a diluent, and alkyd resin. The most preferable oil coagulant is CI010DF08 which is commercially available and may be obtained from C.I. Agent Solution. In a case in which the detection target liquid is moisture, the detection line may be manufactured by using a material that may form a conductive line. In a case in which the detection target liquid is a conductive liquid, the leakage detection composition may include conductive ink, silver compound ink, a conductive carbon dispersion liquid, a mixture of a synthetic resin binder, a conductive polymer, or the like. The composition, which forms the detection line 220, is not limited to the aforementioned exemplary embodiment, and all of the compositions, which are used for leakage detection lines of film detecting sensors in the related art, may be used. A detailed configuration of the detection unit 200 will be described below in detail for each exemplary embodiment.

The non-woven fabric 310 is made of a material having adsorptive power that adsorbs only the type of liquid to be detected, such that the non-woven fabric 310 absorbs inward the type of liquid to be detected and prevents a liquid, other than the type of liquid to be detected, from being absorbed to the inside of the cable. The non-woven fabric 310 protects the detection unit 200 from external impact, friction, or foreign substances, absorbs only the detection target liquid, and brings the detection target liquid into contact with the detection unit 200. In a case in which the detection target liquid is water or an acidic or basic liquid, a non-woven fabric, which has absorptiveness in accordance with inherent surface tension of the liquid, may be used as the non-woven fabric. The absorptive non-woven fabric may be manufactured by adjusting the amount of absorptive raw material which is added, in accordance with the type of the detection target liquid, into a polymeric material such as polyethylene terephthalate (PET), polypropylene (PP), polyethylene (PE), or polycarbonate (PC) that hardly absorbs water. The absorptiveness non-woven fabric may include Fluff pulp or the like. In a case in which the detection target liquid is a liquid hydrocarbon compound, the non-woven fabric 310 may be made of a material that uses a polymer such as PET, PC, or PP as a main component. The non-woven fabric 310 is manufactured in the form of a band having a thickness of 0.01 mm to 50 mm and a width of 2 mm to 100 mm and may be wound to overlap and cover, without gap, a surface of the electric wire core 100 coupled to the detection unit 200 by moving forward the electric wire core 100 coupled to the detection unit 200 while continuously rotating the electric wire core 100 at a predetermined speed. It is possible to adjust a speed and the amount of the detection reaction caused by the contact with the detection target liquid by adjusting a thickness of the non-woven fabric 310 and the number of times the non-woven fabric 310 overlaps.

The first braided layer 320 may be braided with non-conductive yarn. That is, the first braided layer 320 may be braided with yarn made of a material such as non-conductive fluoride resin, a glass fiber, or polymer. The first braided layer 320 may be manufactured by using a material having shielding properties against external physical impact or mechanical strength, weather resistance against a climatic change, resistance against foreign substances, corrosion resistance, and the like. The first braided layer 320 may be braided with a flexible material which has a diameter of 0.01 mm to 3.0 mm and has a circular or elliptical cross section. The first braided layer 320 tightly fixes an assembled structure of the detection line 220 and the non-woven fabric 310 in the leakage detection cable and protects the detection unit 200 therein from physical impact, pressing force, frictional force, bending force, corrosion, climatic changes, and the like applied from the outside of the leakage detection cable. In addition, the first braided layer 320 may have a structure that may allow the detection target liquid to penetrate through the first braided layer 320 well and minimize heat transfer to the inside of the leakage detection cable.

One end of the conductive wire 110 and one end of the detection line 220 of the detection unit 200 are connected to a detection controller, and the other end of the detection line 220 and the other end of the conductive wire 110 are also connected to each other by a terminal connector or the like, such that applied detection electric power is applied to the conductive wire 110 through the detection line and then applied to the controller again.

FIG. 3 is a cross-sectional view (FIG. 3A) and an exploded perspective view (FIG. 3B) illustrating a leakage detection cable according to another exemplary embodiment of the present invention. The leakage detection cable according to the exemplary embodiment illustrated in FIG. 3 has a configuration in which the non-woven fabric 310 is omitted from the leakage detection cable according to the exemplary embodiment illustrated in FIG. 2. The leakage detection cable according to the exemplary embodiment illustrated in FIG. 3 is configured by coupling the detection unit 200 onto the electric wire core 100 and surrounding the detection unit 200 with the first braided layer 320 without the non-woven fabric 310. The leakage detection cable according to the exemplary embodiment illustrated in FIG. 3 may be installed in a case in which an installation environment is stable and has an advantage in that a small amount of liquid may be quickly detected.

FIG. 4 is a cross-sectional view (FIG. 4A) and an exploded perspective view (FIG. 4B) illustrating a leakage detection cable according to still another exemplary embodiment of the present invention. The leakage detection cable according to the exemplary embodiment illustrated in FIG. 4 is configured such that the second braided layer of the leakage detection cable according to the exemplary embodiment illustrated in FIG. 2 is configured as a non-conductive braided layer 120'. The non-conductive braided layer 120' is braided with yarn made of a circular or elliptical flexible material such as fluoride resin, a glass fiber, or a polymeric material which does not absorb water or moisture and has a diameter of 0.01 mm to 3.0 mm. The detection unit 200 is coupled to the outside of the non-conductive braided layer 120' by omitting the sheath layer 130. Thereafter, a non-woven fabric 240 is coupled and then the first braided layer 320 is coupled. The leakage detection cable according to the exemplary embodiment illustrated in FIG. 4 may be installed in an installation environment in which physical/mechanical strength is comparatively less required and electric power noise is not high. The leakage detection cable according to the exemplary embodiment illustrated in FIG. 4 may have a comparatively small diameter.

FIG. 5 is a cross-sectional view (FIG. 5A) and an exploded perspective view (FIG. 5B) illustrating a leakage detection cable according to yet another exemplary embodiment of the present invention. The leakage detection cable according to the exemplary embodiment illustrated in FIG. 5 has a configuration in which the non-woven fabric 310 is omitted from the leakage detection cable according to the exemplary embodiment illustrated in FIG. 4. The leakage detection cable according to the exemplary embodiment illustrated in FIG. 5 may be installed in an installation environment in which physical/mechanical strength is comparatively less required and electric power noise is not high. The leakage detection cable according to the exemplary embodiment illustrated in FIG. 5 may quickly detect a small amount of leaking liquid and may have a comparatively small diameter.

FIG. 6 is a view illustrating the exemplary embodiments of the detection units 200 of the leakage detection cables. FIG. 6A illustrates an exemplary embodiment in which the detection unit 200 having a band shape, which is made by manufacturing a leakage detection composition in the form of a film and then cutting the leakage detection composition by a predetermined width, is wound, in the form of a screw, around an outer surface of the electric wire core 100. FIG. 6B illustrates an exemplary embodiment in which the detection line 220 is formed by plating, vacuum-vapor-depositing, or printing a leakage detection composition with a predetermined width and a predetermined interval onto a film base layer 210, the film base layer 210 on which the detection line 220 is formed is cut, wound, and coupled, in the form of a screw, on the electric wire core 100. FIG. 6C illustrates an exemplary embodiment in which the detection line 220 is formed by printing a leakage detection composition directly onto the outer surface of the electric wire core 100 by using various types of printing/coating devices. FIG. 6D illustrates an exemplary embodiment in which the detection unit 200 covers the entire surface of the electric wire core 100 by applying a leakage detection composition with a predetermined thickness onto the entire surface of the electric wire core 100.

FIGS. 7 to 11 are views schematically illustrating methods for manufacturing the respective exemplary embodiments illustrated in FIG. 6. FIG. 7 is a view illustrating a process of manufacturing the exemplary embodiment illustrated in FIG. 6A, a leakage detection composition and fluoride resin or a polymeric compound are mixed at a predetermined ratio and manufactured in the form of a film having any one thickness selected from 0.01 μm to 100 μm (FIG. 7A), and then the band-shaped detection line 220 is manufactured by cutting the film by any one width selected from 0.01 mm to 100 mm (FIG. 7B). The band-shaped detection line 220 is coupled to surround, in the form of a screw in a state of being spaced at a predetermined interval, the surface of the electric wire core 100 by moving forward the electric wire core 100 while continuously rotating the electric wire core 100 (FIG. 7C).

FIGS. 8 and 9 are views illustrating a process of manufacturing the exemplary embodiment illustrated in FIG. 6B, and particularly, the upper surface of the film base layer 210 is coated with a liquid detection composition and the liquid detection composition is cured (FIG. 8A), and then the band-shaped detection unit 200 is formed by cutting the film base layer 210, which has a liquid detection composition coating layer, by any one width selected from 0.01 mm to 100 mm (FIG. 8B). The film base layer 210 may be made of fluoride resin such as polytetrafluoroethylene (PRFE), polyvinylidene fluoride (PVDF), or perfluoroalkoxy alkane (PFA) or polymeric resin such as polyethylene terephthalate (PET), polypropylene (PP), polyethylene (PE), or polyvinyl chloride (PVC). The film base layer 210 may have a thickness of 10 μm to 300 μm. The band-shaped detection unit 200 includes the film base layer 210 and the detection line 220. As illustrated in FIG. 8C, the detection unit 200, which is manufactured in a band shape, is coupled to surround, in the form of a screw in a state of being spaced at a predetermined interval, the surface of the electric wire core 100 by moving forward the electric wire core 100 while continuously rotating the electric wire core 100.

In the exemplary embodiment illustrated in FIG. 9, the band-shaped detection unit 200 is manufactured by printing, at a predetermined interval, a liquid detection composition onto the film base layer 210 and curing the liquid detection composition to form the multiple detection lines 210 each having a width of 0.01 mm to 100 mm and a thickness of 0.01 μm to 100 μm (FIG. 9A), and then cutting the film base layer 210 by a predetermined width larger than the width of the detection line 220, as illustrated in FIG. 9B. As illustrated in FIG. 9C, the detection unit 200, which is manufactured as described above, is coupled to surround, in the form of a screw in a state of being spaced at a predetermined interval, the surface of the electric wire core 100 by moving forward the electric wire core 100 while continuously rotating the electric wire core 100.

FIG. 10 is a view illustrating a process of manufacturing the exemplary embodiment illustrated in FIG. 6C, and as illustrated in FIG. 10A, a liquid detection composition is printed directly onto the surface of the electric wire core 100 by using a printing/coating device 400, thereby forming the detection unit 200. That is, the printing/coating device 400 is installed to be adjacent to the surface of the electric wire core 100, a liquid detection composition coating liquid is discharged through a coating liquid injection port 410, and the electric wire core 100 is moved forward while being continuously rotated, such that as illustrated in FIG. 10B, the detection unit 200 is coupled to surround, in the form of a screw in a state of being spaced at a predetermined interval, the surface of the electric wire core 100. It is possible to adjust an interval of the detection unit 200 by adjusting a forward movement speed of the electric wire core 100. It is possible to adjust a line width and a thickness of the detection unit 200 by adjusting a discharge port and a discharge liquid of the printing/coating device 400. The detection unit 200 passes through a dryer after passing through the printing/coating device 400, such that the coated detection unit 200 may be cured.

FIG. 11 is a view illustrating a process of manufacturing the exemplary embodiment illustrated in FIG. 6D and illustrates an exemplary embodiment in which a leakage detection composition with a predetermined thickness is applied onto the entire surface of the electric wire core 100 by using the printing/coating device 400 and then the leakage detection composition is cured, such that the detection unit 200 covers the entire surface of the electric wire core 100.

In FIGS. 2 to 10, the detection unit 200 is illustrated as having the single detection line 220, but this illustration is made just to simplify the description, and multiple detection lines 220 may be formed as necessary. Hereinafter, the configurations of the detection units 200 will be described in detail with reference to FIGS. 12 to 24.

FIGS. 12 and 13 are cross-sectional views schematically illustrating configurations of detection units for detecting a water leakage. FIG. 12 illustrates a detection unit for merely detecting the presence or absence of a water leakage, and FIG. 13 illustrates a detection unit capable of detecting a water leakage distance together with the presence or absence of a water leakage. As illustrated, the detection unit 200 has the two or four detection lines 220 formed on the film base layer 210 by printing or vacuum vapor deposition, and a protective layer 230 may be coupled to the detection lines 220 with a bonding layer 250 interposed therebetween or the protective layer 230 may be coupled to the detection line 220 without the bonding layer 250. A bonding layer 240 to be attached to the electric wire core 100 may be additionally provided on a rear surface of the film base layer 210. The detection line 220 is made of an electrically conductive material and may be made of conductive ink, a silver compound, or the like. The protective layer 230 may be made of PET, PE, PVC, or a fluoride resin-based material such as PTFE or FEP, and sensing holes 231 may be penetratively formed at predetermined intervals at positions corresponding to the detection lines 220. When a water leakage occurs, moisture is introduced through the sensing hole 231 at the position at which the water leakage occurs, and the detection lines 220 made of a conductive material conduct electricity through the moisture, such that the controller connected to the detection line 220 may detect the presence or absence of the water leakage. Although not illustrated, a coating layer may be additionally provided on the detection line 220 before the protective layer 230 is coupled. The coating layer may be made of a composite mixture of a fluoride resin material and carbon which has porosity, allows a liquid to easily pass therethrough, and is not easily removed or dissolved by a liquid. The coating layer may be formed, with a coating thickness of 0.1 μm to 50 μm, on the detection line 220 on the upper surface of the film base layer 210 by slot die coating, comma coating, or the like by using coating ink made by mixing, at a predetermined ratio, various polymeric materials (polyurethane, alkyd resin, enamel, PE, PC, PP, polyvinyl chloride, and other vinyl-based materials), which have good reactivity with a liquid (water, an acidic solution, an alkaline solution, and an organic synthetic chemical solution, etc.), with non-conductive carbon (metal oxide-based carbon or the like) which has porosity and allows various types of liquids to easily penetrate therethrough. Therefore, the leaking liquid easily penetrates through the coating film because of the porosity of carbon and the polymeric material having good reactivity with a liquid, and the leaking liquid allows the pair of detection lines 220 at the lower side thereof to conduct electricity, such that it is possible to ascertain the presence or absence of a leakage of a conductive liquid or a leaking position.

FIG. 14 is a view illustrating a cross section of the detection unit 200 for detecting the presence or absence of an organic liquid. In the detection unit 200 of the leakage detection cable according to the exemplary embodiment illustrated in FIG. 14, a conductive line 221 and the detection line 220 are spaced apart from each other and disposed in parallel in a longitudinal direction on the film base layer 210. The detection line 220 is made of an oil leakage detection composition having a mixture including carbon nanotubes (CNT), an oil coagulant, a diluent, and alkyd resin. The oil coagulant is a substance that coagulates and changes hydrocarbon such as petroleum into a material such as rubber, and the oil coagulant is commercially available from C.I. Agent Solution and the like. The oil leakage detection composition further includes silver flakes. The protective layer 230 is laminated on the conductive line 221 and the detection line 220 with or without the bonding layer 250 interposed therebetween. The sensing holes 231 may be penetratively formed at predetermined intervals at the positions of the protective layer 230 that correspond to the detection lines 220. The conductive line 221 is not exposed to the outside, but only the detection line 220 is exposed through the sensing hole 231. One end of the conductive line 221 and one end of the detection line 220 are connected to the controller, and the other end of the conductive line 221 and the other end of the detection line 220 are connected to each other, such that detection electric power, which is applied from the controller, is inputted back to the controller through the detection line 220 and the conductive line 221. Whether the oil leakage is detected is determined based on a change in value of the electric current applied to the controller. The conductive line may not be formed on the film base layer 210 as illustrated, but the one or more conductive wires 110 of the electric wire core 100 may be used.

FIGS. 15 and 16 are cross-sectional views schematically illustrating configurations of detection units for detecting an acidic or basic liquid chemical. FIG. 15 illustrates a detection unit for detecting the presence or absence of a liquid chemical, and FIG. 16 illustrates a detection unit 220 capable of detecting a liquid chemical detection distance together with the presence or absence of a liquid chemical. As illustrated, the detection unit 200 may be manufactured by forming the detection line 220 on the film base layer 210 by plating, printing, or vacuum vapor deposition. The detection line 220 is made of an electrically conductive material, and the detection line 220 is formed by printing conductive ink, a silver compound, or the like or configured as a conductive circuit formed by a copper thin plate, or other conductive metal thin plates, vapor deposition, or plating. A detection coating film 260, which is made of a material which is dissolved, eroded, or decomposed by an acidic or alkaline solution, is formed on the upper surface of the film base layer 210 so as to cover the detection lines 220. The protective layer 230 may be coupled to the detection coating film 260 with the bonding layer 250 interposed therebetween, or the protective layer 230 may be coupled to the detection coating film 260 without the bonding layer 250. The bonding layer 240 to be attached to the electric wire core 100 may be additionally provided on the rear surface of the film base layer 210. The protective layer 230 may be made of PET, PE, PVC, or a fluoride resin-based material such as PTFE or FEP, and the sensing holes 231 may be penetratively formed at predetermined intervals at the positions corresponding to the detection lines 220. When a liquid chemical leaks, the liquid chemical is introduced through the sensing hole 231 at the position at which the liquid chemical leaks, and the liquid chemical decomposes or penetrates through the detection coating film 260, such that the detection lines 220 made of a conductive material conduct electricity through the liquid chemical, and as a result, the controller connected to the detection lines 220 may detect whether the liquid chemical leaks. The detection coating film 260 may include carbon having low conductivity. In a case in which carbon has porosity, the leaking conductive solution penetrates into the pores of the carbon, such that the pair of detection lines at the lower side of the detection coating film 260 comes into contact with each other and may conduct electricity. The detection coating film 260 protects the detection lines from external physical and environmental stimulation. In a case in which the detection target liquid is an acidic solution, the detection coating film 260 may be made of a polymeric compound selected from a group consisting of polyacetal, polymethyl methacrylate, polycarbonate, polyamide, saline, polyarylate, polyester, polyester elastomer, phenol resin, cellulose-based resin, and melamine resin. In a case in which the detection target liquid is a basic solution, the detection coating film 260 may be made of a polymeric compound selected from a group consisting of polymethyl methacrylate, polycarbonate, polyethylene terephthalate, polyether imide, polyimide, phenol resin, polyamide imide, polybutylene terephthalate, polyacetal copolymer, polyacetal homopolymer, cellulose-based resin, and polyolefin elastomer. A coating thickness of the detection coating film 260 may be adjusted in accordance with a liquid penetration/reaction performance of a material.

FIGS. 17 and 18 are views illustrating a method for manufacturing the leakage detection cable according to another exemplary embodiment of the present invention. FIG. 17 is a view illustrating a process of forming the sheath layer 130 on the electric wire core 100. The sheath layer 130 is formed as the conductive wires 110 of the electric wire core 100 pass through a sheath forming device 500 (FIG. 17A). An injection (extrusion or drawing) molding device may be used as the sheath forming device 500. The sheath forming device 500 has an electric wire sheath resin inlet 510, and one or more protrusions 520 which are formed at a front end portion of the sheath forming device 500 and may form grooves 131 in the sheath layer 130. As illustrated in FIG. 17B, straight grooves 131 are formed as the conductive wires 110 of the electric wire core 100 move forward straight. As illustrated in FIG. 17C, when the conductive wires 110 move forward while rotating, screw-shaped grooves 131' are formed. FIG. 18A illustrates the electric wire core 100 in which the screw-shaped grooves 131' are formed in two rows in the sheath layer 130, and FIG. 18B is a view illustrating a state in which the detection lines 220 are formed in the grooves 131'. The detection line 220 is formed by inputting a leakage detection composition into the groove 131' and curing the leakage detection composition.

FIG. 19A illustrates a state in which the grooves 131 are formed in the sheath layer 130 of the electric wire core 100, as illustrated in FIGS. 17 and 18. A liquid chemical detection unit for detecting an acidic solution or a basic solution will be described as an example. As illustrated in FIG. 19B, a conductive composition such as copper, gold, or silver, which may form a conductive circuit, is inputted into the two rows of grooves 131 to form the detection lines 220 and/or the conductive lines 221, the conductive composition is cured, and then a coating liquid for forming the detection coating film 260 is inputted and cured. The detection coating film 260 is identical to the detection coating film 260 according to the exemplary embodiments illustrated in FIGS. 15 and 16. The groove 131 is covered by the detection coating film 260, and then the protective layer 230 covers the sheath layer 130, as illustrated in FIG. 19C. The protective layer 230 may have the sensing holes 231 penetratively formed at predetermined intervals at the positions corresponding to the detection lines 220.

FIG. 20 is a view illustrating cross sections of the electric wire core 100 according to the exemplary embodiment illustrated in FIG. 19. As illustrated, the grooves 131 are formed in the sheath layer 130 of the electric wire core 100 (FIG. 20A), the leakage detection composition is inputted into the grooves 131 and then cured to form the detection lines 220, a coating liquid for forming the detection coating film 260 is inputted and cured (FIG. 20B), and then the entire electric wire core 100 is coated to form the protective layer 230.

FIG. 21 is a transparent view (FIG. 21A) and a partially cross-sectional view (FIG. 21B) schematically illustrating a liquid chemical detection cable according to another exemplary embodiment of the present invention. As illustrated, the pair of conductive detection lines 220 for detecting a liquid chemical is formed on the electric wire core 100. As illustrated, the detection lines 220 may be wound in the form of a screw. On the detection line 220, an outer surface of the cable may be coated so that the detection coating film 260 surrounds the detection lines 220. Although not illustrated in FIG. 21, the protective layer, the non-woven fabric 310, or the first braided layer 320 may be coupled to the detection coating film 260.

FIGS. 22 to 24 are cross-sectional views schematically illustrating the detection units 200 according to still further exemplary embodiments of the present invention. FIG. 22A illustrates an exemplary embodiment in which the two detection lines 220 are formed on the film base layer 210 and the upper surfaces of the detection lines 220 are coated with protective coating layers 280. FIG. 22A illustrates the detection unit 200 for detecting a conductive liquid. The protective coating layer 280 is formed to have a narrower width than the detection line 220 and coupled to the upper surface of the detection line 220. FIG. 22B illustrates the detection unit 200 capable of detecting a water leakage distance. The four detection lines 220 are formed on the film base layer 210, and the protective coating layers 280 are formed so that a portion between the two detection lines 220 at a center of the four detection lines 220 is exposed. A line, which is completely surrounded by the protective coating layers, serves as a conductive line. FIG. 22C illustrates the detection unit 200 for merely detecting the presence or absence of a water leakage. A fluoride resin film 140 is formed on the electric wire core 100, and detection line grooves 141 are formed in the fluoride resin film 140. A conductive detection composition is inputted to form the detection line 220, and the detection line 220 is coated with a mixture made by mixing carbon C and various fluoride resin materials having good reactivity with a liquid. In the case in which the detection line 220 is coated with the mixture of carbon and fluoride resin, it is possible to prevent the detection line 220 from being exposed to and damaged by an acidic or basic solution. Reference Numeral 290 indicates the coating layer made of the mixture of carbon and fluoride resin. FIG. 22D illustrates the detection unit 200 for merely detecting the presence or absence of a water leakage according to another exemplary embodiment. The fluoride resin film 140 is formed on the electric wire core 100, and a conductive detection composition is applied to form a conductive detection composition layer, a mixture of carbon C and fluoride resin is applied to form a coating layer, and then the coating layer is etched to form multiple detection lines coated with the mixture of carbon and fluoride resin. FIG. 22E is a view illustrating an exemplary embodiment in which the detection line, which is coated with the mixture of carbon and fluoride resin as illustrated in FIG. 22D, is formed on the film base layer 210 instead of the fluoride resin film 140 of the detection unit 200 illustrated in FIG. 22D, and the protective layer 230 is coupled to the film base layer 210 with the bonding layer 250 interposed therebetween. The sensing holes 231 for detecting a liquid is formed above the detection line 220. The bonding layer 240 to be attached to the outer surface of the electric wire core 100 may be additionally provided on the rear surface of the film base layer 210. FIG. 22F is a view illustrating a state in which the protective layer 230 with the interposed bonding layer 250 is omitted from the detection unit 200 according to the exemplary embodiment illustrated in FIG. 22E. A conductive detection composition is applied onto the film base layer 210 to form a conductive detection composition layer, a mixture of carbon and fluoride resin is applied to form a coating layer, and then the coating layer is etched to form the detection line 220 coated with the mixture of carbon and fluoride resin, or the detection line 220 may be formed by using a printing method using a method such as a silk printing method, gravure roll, slot die coating, or comma coating. FIG. 23 illustrates an exemplary embodiment in which a liquid chemical detection coating liquid 232, which is decomposed by a detection liquid chemical, covers the sensing hole 231 according to the exemplary embodiment illustrated in FIG. 22E.

In the exemplary embodiment illustrated in FIG. 24, the pair of detection lines 220 is formed on the film base layer 210, one line 220' is made of an element such as carbon or copper that has a lower degree of electrolysis than the other line 220", and the other line 220" is made of an element such as zinc or aluminum that has a higher degree of electrolysis than the one line 220'. The film base layer 210 on which the detection lines 220 are formed is coated with an absorbent coating layer 270, which allows a liquid to penetrate therethrough or absorbs a liquid and includes carbon having lower conductivity, as described in the exemplary embodiments illustrated in FIGS. 15 and 16, so that the absorbent coating layer 270 covers the detection lines 220. When the liquid to be detected is absorbed, the one line 220' of the pair of detection lines 220 having a difference in degree of electrolysis acts as a positive electrode, and the other line 220" acts as a negative electrode, such that electricity is generated, and the controller connected to the detection lines 220 detects a leakage of a liquid by an applied electrical signal.

A method for manufacturing a leakage detection cable according to another exemplary embodiment of the present invention will be described below. First, the method includes disposing one or more conductive wires, forming a sheath layer so that the sheath layer covers the one or more conductive wires in a longitudinal direction, forming a detection unit in the longitudinal direction of the sheath layer, and forming a first braided layer to cover the detection unit by braiding non-conductive fibers having absorptiveness in respect to a detection target liquid.

The forming of the detection unit includes attaching a masking tape onto the sheath layer so that a band-shaped interval having a predetermined width and a predetermined thickness is formed in a screw shape, forming a conductive thin film by performing a method selected from coating, printing, vacuum vapor deposition, and plating on the sheath layer to which the masking tape is attached by the attaching of the masking tape, and removing the masking tape.

The forming of the detection unit may use a method of forming a conductive thin film on the entire surface of the sheath layer, and forming a band-shaped conductive detection line having a predetermined width and a predetermined thickness in the longitudinal direction of the surface of the sheath layer by using a photolithography process and an etching process so that the conductive detection line surrounds, in the form of a screw, the surface of the sheath layer. The photolithography process may be performed by processes of forming a conductive thin film on the entire sheath of the electric wire core, performing photoresist (PR) coating, removing photoresist (PR), which is exposed in a shape identical to a shape of the detection line, after masking through an exposure process, etching a portion from which a PR coating film is removed, and removing the remaining photoresist (PR).

The invention claimed is:

1. A leakage detection cable which detects a leakage of a liquid, the leakage detection cable comprising:
    an electric wire core which includes one or more conductive wires, and a sheath layer that covers the one or more conductive wires;
    a detection unit which is coupled in a longitudinal direction of a surface of the electric wire core;
    a first braided layer which is braided with non-conductive fibers and covers the detection unit; and
    a second braided layer which is braided with a fiber made of a conductive material and surrounds the one or more conductive wires to shield the one or more conductive wires,
    wherein the detection unit has a predetermined resistance value that is proportional to a length, and reacts with the liquid such that an output electric current value is changed.

2. The leakage detection cable of claim 1, wherein the sheath layer is braided with the non-conductive fibers.

3. The leakage detection cable of claim 1, further comprising:
    a non-woven fabric which is made of a material having absorptiveness in respect to the detection target liquid and surrounds the detection unit.

4. The leakage detection cable of claim 1, wherein the detection unit includes one or more detection lines manufactured by cutting a film made of a composition, which detects the detection target liquid, in a band shape having a predetermined width.

5. The leakage detection cable of claim 1, wherein the detection unit includes a band-shaped film base layer, and one or more detection lines formed by plating, vacuum-vapor-depositing, or printing a composition, which detects the detection target liquid, on an upper surface of the film base layer.

6. The leakage detection cable of claim 1, wherein the detection unit includes the film base layer, and the detection line formed by plating, vacuum-vapor-depositing, or printing a composition, which detects the detection target liquid, on an upper surface of the film base layer, and then cutting the composition together with the film base layer in a band shape having a predetermined width.

7. The leakage detection cable of claim 4, wherein the detection unit is coupled to surround, in the form of a screw in a state of being spaced at a predetermined interval, an outer surface of the electric wire core.

8. The leakage detection cable of claim 5, wherein a bonding layer to be attached to the outer surface of the electric wire core is additionally coupled to a bottom surface of the film base layer.

9. The leakage detection cable of claim 1, wherein the detection unit includes the detection line formed by printing, plating, or vacuum-vapor-depositing a composition, which detects the detection target liquid, on a surface of the electric wire core in a band shape having a predetermined width.

10. The leakage detection cable of claim 9, wherein the detection line is coupled to surround, in the form of a screw in a state of being spaced at a predetermined interval, a surface of the electric wire core.

11. The leakage detection cable of claim 1, wherein the detection unit is formed by printing, plating, or vacuum-vapor-depositing a composition, which detects the detection target liquid, on the entire surface of the electric wire core.

12. The leakage detection cable of claim 4, wherein when the detection target liquid is a liquid hydrocarbon compound, the composition includes carbon, an oil coagulant, a binder, and a diluent.

13. The leakage detection cable of claim 4, wherein when the detection target liquid is a conductive liquid, the composition is selected from a group consisting of conductive ink, silver ink, conductive polymer, and conductive metal.

14. The leakage detection cable of claim 1, wherein the detection unit includes the detection line which reacts with the detection target liquid, and a conductive line which is electrically connected to the detection line and transmits a signal.

15. The leakage detection cable of claim 1, wherein the detection unit includes the detection line which reacts with the detection target liquid, and one or more of the conductive wires of the electric wire core are connected to the detection line and transmit a signal.

16. The leakage detection cable of claim 4, wherein a protective layer is additionally coupled to the detection unit so as to cover the detection line.

17. The leakage detection cable of claim 16, wherein sensing holes, through which the detection target liquid passes, are formed at predetermined intervals at predetermined positions of the protective layer corresponding to the detection lines.

18. The leakage detection cable of claim 16, wherein the protective layer is formed to have a narrower width than the detection line.

19. The leakage detection cable of claim 16, further comprising:
    a detection coating film which covers the detection line before the protective layer is coupled, and is decomposed by the detection target liquid or allows the detection target liquid to penetrate therethrough.

20. The leakage detection cable of claim 19, wherein the detection coating film is formed by a coating liquid including one or more polymers selected from a group consisting of polyurethane, polyethylene, enamel, varnish, alkyd resin, and vinyl-based resin.

21. The leakage detection cable of claim 19, wherein the detection coating film is formed by a coating liquid including carbon.

22. The leakage detection cable of claim 19, wherein a thickness of the detection coating film is any one selected from 0.05 μm to 100 μm.

23. The leakage detection cable of claim 4, wherein an upper surface of the detection line is coated with a mixture of conductive carbon and fluoride resin.

24. The leakage detection cable of claim 1, wherein a groove portion is formed in the sheath layer of the electric wire core, and a detection line is formed by inputting a composition, which detects the detection target liquid, into the groove portion and curing the composition.

25. The leakage detection cable of claim 24, wherein the groove portion has a predetermined width and a predetermined depth in a longitudinal direction of a surface of the electric wire core and is formed in a screw shape in a state of being spaced at a predetermined interval.

26. A leakage detection cable which detects a leakage of a liquid, the leakage detection cable comprising:
- an electric wire core which includes one or more conductive wires, and a sheath layer that covers the one or more conductive wires;
- a detection unit which is coupled in a longitudinal direction of a surface of the electric wire core; and
- a first braided layer which is braided with non-conductive fibers and covers the detection unit,
- wherein the detection unit has a predetermined resistance value that is proportional to a length, and reacts with the liquid such that an output electric current value is changed and
- wherein the detection unit includes a pair of detection lines, and one line of the pair of detection lines is made of an element that has a higher degree of electrolysis than the other line, and the detection lines are coated with an absorbent, which has absorptiveness in respect to the detection target liquid or allows the detection target liquid to penetrate therethrough, so that the absorbent covers the detection lines.

27. The leakage detection cable of claim 1, wherein the detection unit includes a multilayer conductive circuit line formed by laminating metal, which has relatively low electrical conductivity and has corrosion resistance, on a metal layer having relatively good electrical conductivity.

28. A method for manufacturing a leakage detection cable which detects a leakage of a liquid, the method comprising:
  a) disposing one or more conductive wires;
  b) forming a sheath layer to cover the one or more conductive wires in a longitudinal direction;
  c) disposing a detection unit in a longitudinal direction of the sheath layer; and
  d) forming a first braided layer by braiding non-conductive fibers to cover the detection unit,
  wherein the step c) includes forming the conductive thin film on an entire surface of the sheath layer, and forming a band-shaped conductive detection line having a predetermined width and a predetermined thickness in a longitudinal direction of a surface of the sheath layer by using a photolithography process and an etching process so that the conductive detection line surrounds, in the form of a screw, the surface of the sheath layer.

* * * * *